(12) United States Patent
Nakamura

(10) Patent No.: US 8,776,743 B2
(45) Date of Patent: Jul. 15, 2014

(54) VARIABLY OPERATED VALVE APPARATUS OF INTERNAL COMBUSTION ENGINE AND START CONTROL APPARATUS OF INTERNAL COMBUSTION ENGINE

(75) Inventor: Makoto Nakamura, Zushi (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 112 days.

(21) Appl. No.: 13/450,526

(22) Filed: Apr. 19, 2012

(65) Prior Publication Data

US 2012/0304945 A1 Dec. 6, 2012

(30) Foreign Application Priority Data

Jun. 3, 2011 (JP) ................................ 2011-124771

(51) Int. Cl.
- *F01L 1/34* (2006.01)
- *F01L 1/344* (2006.01)
- *F01L 13/00* (2006.01)
- *F02D 13/02* (2006.01)

(52) U.S. Cl.
CPC ........... *F01L 1/3442* (2013.01); *F01L 13/0021* (2013.01); *F02D 13/0203* (2013.01)
USPC ...................... 123/90.17; 123/90.16; 701/105

(58) Field of Classification Search
CPC . F02D 13/0211; F02D 13/0215; F02D 13/08; F02D 13/0203; F01L 1/3442; F01L 13/0021; F01L 2820/032; F03B 2075/125
USPC ........................ 123/90.15, 90.17, 90.31, 90.16
See application file for complete search history.

(56) References Cited

U.S. PATENT DOCUMENTS

| 7,458,346 | B2 * | 12/2008 | Gibson ...................... 123/90.15 |
| 2008/0011253 | A1 * | 1/2008 | Nakamura ................. 123/90.15 |
| 2011/0088644 | A1 | 4/2011 | Nakamura |
| 2012/0037105 | A1 | 2/2012 | Nakamura |

FOREIGN PATENT DOCUMENTS

| JP | 2003-021030 | 1/2003 |
| JP | 2003-172112 | 6/2003 |
| JP | 2006-125276 | 5/2006 |
| JP | 2008-190495 | 8/2008 |
| JP | 2011-85078 | 4/2011 |

OTHER PUBLICATIONS

JP Office Action for Japanese Application No. 2011-124771, issued on Mar. 17, 2014.

\* cited by examiner

*Primary Examiner* — Zelalem Eshete
(74) *Attorney, Agent, or Firm* — Antonelli, Terry, Stout & Kraus, LLP.

(57) ABSTRACT

In a variably operated valve apparatus of an internal combustion engine and a start control apparatus of the same engine, the internal combustion engine being equipped with a crank position control mechanism by means of which a stop position of a piston is controllable at a time of an engine stop and the variably operated valve apparatus being capable of variably controlling at least a closure timing of an intake valve, the closure timing of the intake valve is placed at a first position which is more advance angle side than the stop position of the piston of one of engine cylinders in a compression stroke and which is stop controlled by means of the crank position control mechanism and one of the remaining cylinders which is in a suction stroke has its the intake valve open, at the time of the engine stop.

21 Claims, 13 Drawing Sheets

# VARIABLY OPERATED VALVE APPARATUS OF INTERNAL COMBUSTION ENGINE AND START CONTROL APPARATUS OF INTERNAL COMBUSTION ENGINE

BACKGROUND OF THE INVENTION (1) Field of the Invention

The present invention relates to a variably operated valve apparatus of an internal combustion engine and a start control apparatus of the internal combustion engine which are capable of achieving an improvement in startability of the engine.

(2) Description of related art

A Japanese Patent Application First Publication No. 2006-125276 published on May 18, 2006 exemplifies a previously proposed variably operated valve apparatus of the internal combustion engine.

In this previously proposed variably operated valve apparatus, a variable mechanism controls a closure timing of an intake valve toward a retardation angle side when a start condition of the engine is established.

Thus, an in-cylinder compression at a top dead center of a piston in one of a plurality of engine cylinders which is in a compression stroke is reduced (decompressed) to reduce an effective compression ratio. Consequently, a revolution rise in a cranking is made earlier to achieve a favorable startability.

SUMMARY OF THE INVENTION

However, the previously proposed variable operated apparatus has the following two technical tasks to be solved.

That is to say, first, at a time of an engine start, it is necessary to excessively largely retard the closure timing of the intake valve (IVC) toward an intermediate position between a piston top dead center to a piston bottom dead center or toward a proximity to the top dead center. On the other hand, at a low-revolution, high-load region, it is necessary to largely advance the IVC toward the proximity to the bottom dead center in order to increase a low-speed torque. Consequently, since a wide whole conversion angle is needed to take, a heavy load is imposed on the variable mechanism and there is a possibility of worsening an operation response characteristic.

In addition, the compression at the time of start of the engine receives an influence from not only IVC but also a stop position of the piston (a crankshaft) of the cylinder in the compression stroke at the time of the engine stop.

That is to say, when the engine stopped state is considered, there are many cases where the piston of one of the cylinders in the compression stroke is pushed downward from the top dead center side according to the in-cylinder compression and is stopped at the intermediate position between the upper top dead center and the bottom dead center and, in this state, the atmospheric pressure is invaded into the corresponding cylinder via a gap between the piston and a cylinder bore during an interval of time during which the engine is left un-operated up to the subsequent restart. It should be noted that, in a case where the stopped position of the piston is advanced than the IVC, the compression is increased along with the rise in the subsequent piston with IVC as the atmospheric pressure at a time of the engine start but, if the stop position of the piston is retarded than the IVC, this piston stopped position as the atmospheric pressure, the compression is increased along with the subsequent rise in the piston. In other words, both cases occur of a case where the compression increase is determined by the IVC and is determined by the stopped position of the piston. Thus, a variation occurs in the compression and the cranking characteristic becomes unstable. Consequently, a cranking characteristic becomes unstable and no stable startability can be obtained.

It is, therefore, an object of the present invention to provide a variably operated valve apparatus to of the internal combustion engine and a start control apparatus of the internal combustion engine which are capable of suppressing the variation in the compression at the time of the engine start without need to excessively enlarge the conversion angle of the IVC through the variable mechanism.

According to one aspect of the present invention, there is provided with a variably operated valve apparatus for use in an internal combustion engine, the internal combustion engine being equipped with a crank position control mechanism by means of which a stop position of a piston is controllable at a time of an engine stop and the variably operated valve apparatus being capable of variably controlling at least a closure timing of an intake valve, wherein the closure timing of the intake valve is placed at a first position which is more advance angle side than the stop position of the piston of one of cylinders in a compression stroke and which is stop controlled by means of the crank position control mechanism and one of the remaining cylinders which is in a suction stroke has its the intake valve open, at the time of the engine stop.

According to another aspect of the present invention, there is provided with a start control apparatus of an internal combustion engine, comprising: a crank position control mechanism that is controllable a stop position of a piston via a crankshaft at a time of an engine stop; and a variable mechanism that is controllable at least a closure timing of an intake valve, wherein, at the time of the engine stop, the variable mechanism controls the closure timing of the intake valve and the crank position control mechanism controls the stop position of one of engine cylinders in a compression stroke and in which a stop control is preformed by the crank position control mechanism to a position at a more retardation angle side than a predetermined position of the closure timing of the intake valve.

DETAILED DESCRIPTION OF THE INVENTION

Hereinafter, preferred embodiments of a variably operated valve apparatus of an internal combustion engine and a start control apparatus of the internal combustion engine have been described in details with reference to the attached drawings.
(First Embodiment)

In a first preferred embodiment, the present invention is applicable to an idle-stop vehicle in which the internal combustion engine is automatically stopped and started not dependent upon its own intention and in which the internal combustion engine is a four-cycle, four-cylinder, spark ignited, and gasoline specification engine.

Figure 1:
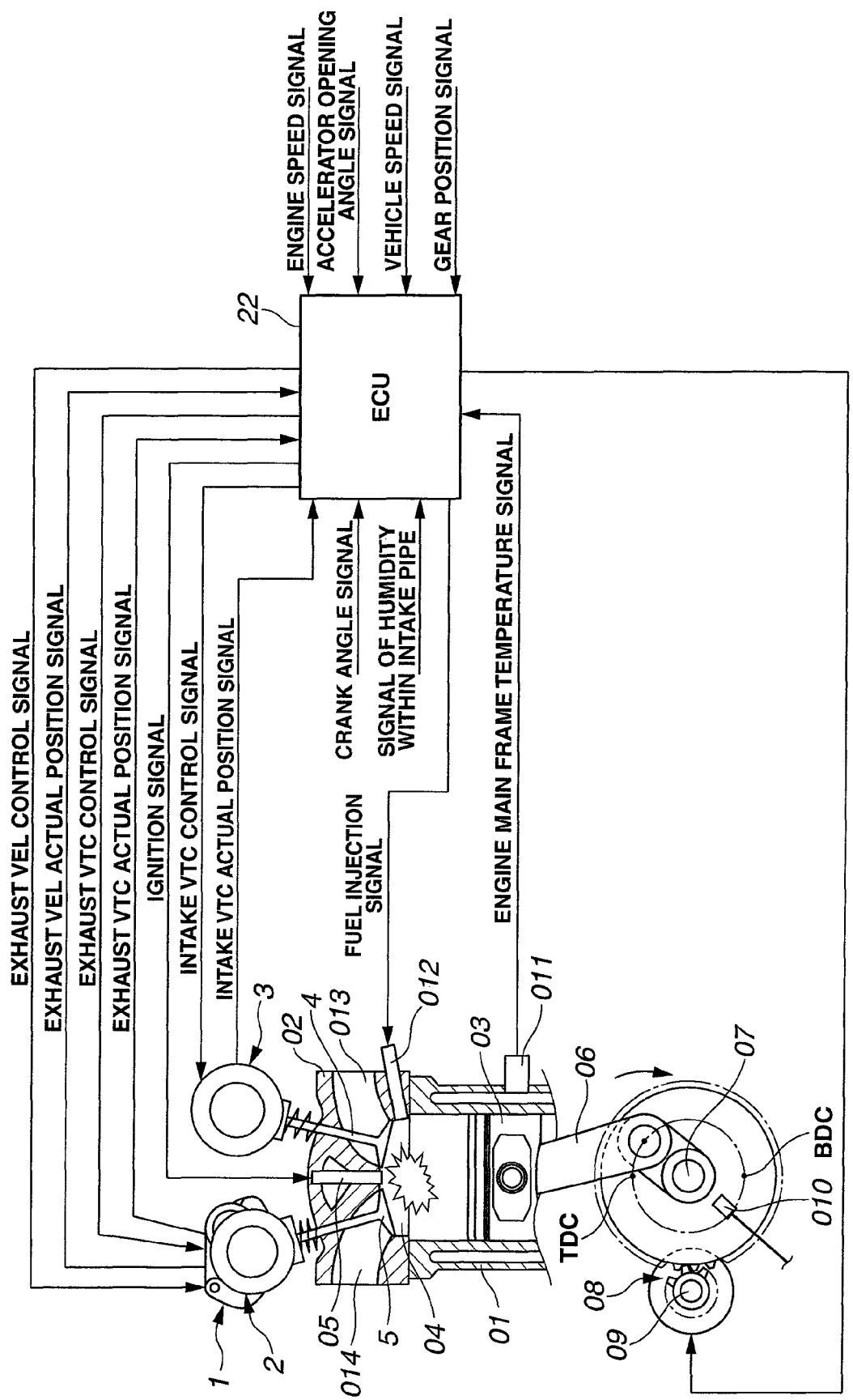
FIG. 1 is a rough configuration view representing an internal combustion engine to which a variably operated valve apparatus according to the present invention is applicable.

This internal combustion engine is, as shown in FIG. 1, constituted by a combustion chamber 04 formed between a cylinder block 01 and a cylinder head 02 via a piston 03 and a spark (ignition) plug 05 is installed at a substantially center position of cylinder head 02, Piston 03 is linked to a crankshaft 07 via a connecting rod 06 and this crankshaft 07 is so structured that an ordinary start at a time of a cold of the engine (cold start) and an automatic start (cranking) after the idling stop are carried out by means of a drive motor 09 via a pinion gear mechanism 08. It should be noted that crankshaft 07 is used to detect a crank angle and an engine speed by means of a crank angle sensor 010 as will be described later.

A water (coolant) temperature sensor 011 which detects a temperature of water (coolant) within a water jacket is installed on cylinder block 01. A fuel injection valve 012 which directly injects fuel within combustion chamber 04 is installed within combustion chamber 04.

Furthermore, two intake valves 4, 4 and exhaust valves 5, 5 per cylinder are slidably installed which open or close an intake port 013 and an exhaust port 014 formed within an inside of cylinder head 02 and the variably operated valve apparatus is installed at the intake valve side and the exhaust valve side.

The variably operated valve apparatus, as shown in FIGS. 2, 3A, 3B, and 4, includes: an exhaust valve VEL (Continuously Valve Event and Lift) 1 which is a first variable mechanism controlling a valve lift and a working angle (open interval) of both exhaust valves 5, 5 of the internal combustion engine; an exhaust VTC (Valve Timing Control) 2 which is a second variable mechanism controlling open-and-closure timings of both exhaust valves 5, 5; and an intake VTC 3 which is a third variable mechanism controlling the open-and-closure timings of both intake valves 4, 4. In addition, an electronic controller 22 controls respective operations of above-described exhaust VEL 1, exhaust VTS 2, and intake VTC 3 in accordance with an engine driving state as will be described in details later.

Figure 2:
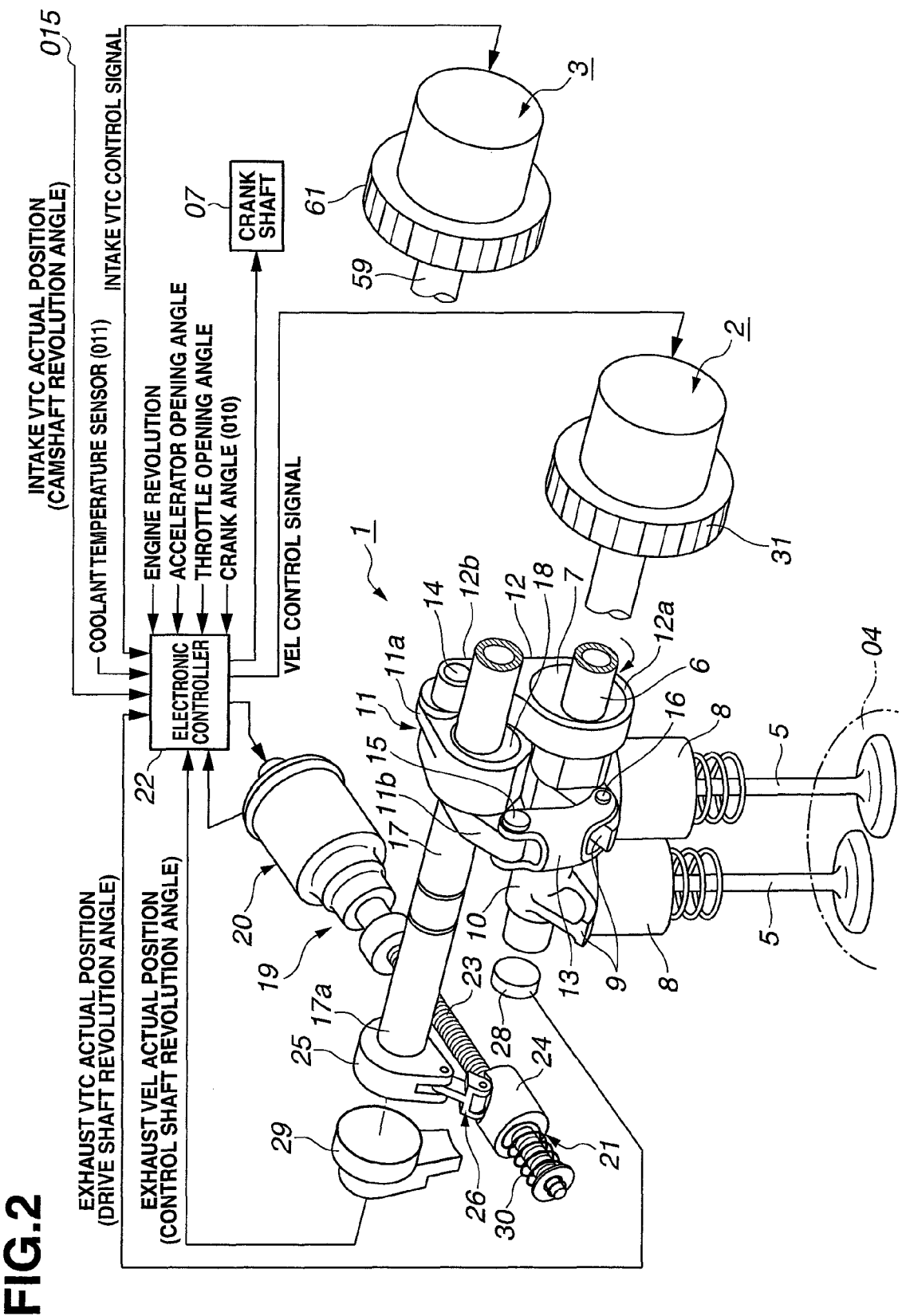
FIG. 2 is an essential part perspective view representing the variably operated valve apparatus in a first preferred embodiment according to the present invention

It should be noted that only above-described exhaust VEL 1 and intake VTC 3 are used in this first embodiment, exhaust VTC 2 is not used therein, but, for convenience, intake VTC 2 is described in FIG. 2 in addition to exhaust VEL 1 and intake VTC 2.

Above-described exhaust VEL 1 is the same structure as described in a Japanese Patent Application First Publication No. 2003-172112 published on Jun. 20, 2003 (applied to the intake valve side). Exhaust VEL 1 will be described briefly with reference to FIGS. 2 and 3. A hollow drive shaft 6 is supported rotatably on a bearing 27 provided on an upper part of a cylinder head 02. A rotary cam 7 fixedly disposed on an outer peripheral surface of drive shaft 6. Two swing cams 9, 9 slidably contacted on upper surfaces of respective valve lifters 8, 8 make valve open operations for respective exhaust valves 5, 5 disposed on upper end sections of respective exhaust valves 5, 5. A transmission mechanism interposed between rotary cam 7 and swing cams 9, 9 converts a revolution force of rotary cam 7 into a swing motion to transmit a converted force as a swing force to swing cams 9, 9. Exhaust VEL 1 includes a drive shaft 6, rotary cam 7, two swing cams 9, 9, and the transmission mechanism.

A revolving force (torque) is transmitted from crankshaft 07 via a timing sprocket 31 installed at one end section of drive shaft 6 through a timing chain (not shown). A rotation direction of the revolving force is set to a clockwise direction (an arrow-marked direction) in FIG. 2. As described above, since, in the first embodiment, although exhaust VTC 2 is installed but not used, a rotational phase between drive shaft 6 and timing sprocket 31 is not varied and the phase conversion is not carried out.

Rotary cam 7 is of an approximately ring shape and is fixed on drive shaft 6 via an inserting hole for drive shaft 6 formed in an inner axis direction of rotary cam 7 and an axis center Y of a cam main body is offset from axial center X of drive shaft 6 by a predetermined quantity.

Both swing cams 9, 9 are integrally installed on both ends of a cylindrical camshaft 10. Camshaft 10 is rotatably supported on drive shaft 6 via an inner peripheral surface of swing cams 9, 9. In addition, a cam surface 9a constituted by a base circle surface, a ramp surface, and a lift surface are contacted at a predetermined position of an upper surface of each valve lifter 8 in accordance with a swing position of each of both swing cams 9, 9.

The transmission mechanism includes: a rocker arm 11 arranged on an upper part of drive shaft 6, a link to arm 12 for linking one end section 11a of rocker arm 11 with rotary cam 7, and a link rod 13 for linking other end section 11b of rocker arm 11 with rotary cam 7, and a link rod 13 for linking other end section 11b of rocker arm 11 with both swing cams 9, 9.

Rocker arm 11 has a cylindrical base section at a center position thereof rotatably supported on a control cam as will be described later via a supporting hole. On end section 11b of rocker arm 11 is rotatably linked on link arm 12 via a pin 14. Other end section 11b of rocker arm 11 is rotatably linked to one end section 13a of a link rod 13 via a pin 15.

Link arm 12 has a fitting hole provided at a center position of an doughnut shaped base end section 12a into which the cam main frame of rotary cam 7 is rotatably fitted and a projecting end 12b projected from base end section 12a is linked with one end section 11a of rocker arm 11 by means of pin 14.

Other end section 13b of link rod 13 is rotatably linked to a cam nose section of each swing cam 9, 9 via a pin 16.

In addition, a control shaft 17 is rotatably supported on the same bearing member, at the upper position of drive shaft 6, and a control cam 18 slidably fitted into the supporting hole of rocker arm 11 and which serves as a swing fulcrum of rocker arm 11 is fixed on an outer periphery of control shaft 17.

Control shaft 17 is disposed in a forward-and-backward direction (or longitudinal direction) of the engine in parallel to drive shaft 6 and is rotatably controlled by means of a drive mechanism 19. On the other hand, control cam 18 is of a cylindrical shape and its position P2 of a shaft center (axis center of control cam 18) is offset by a predetermined quantity from another shaft center P1.

Figure 5A:
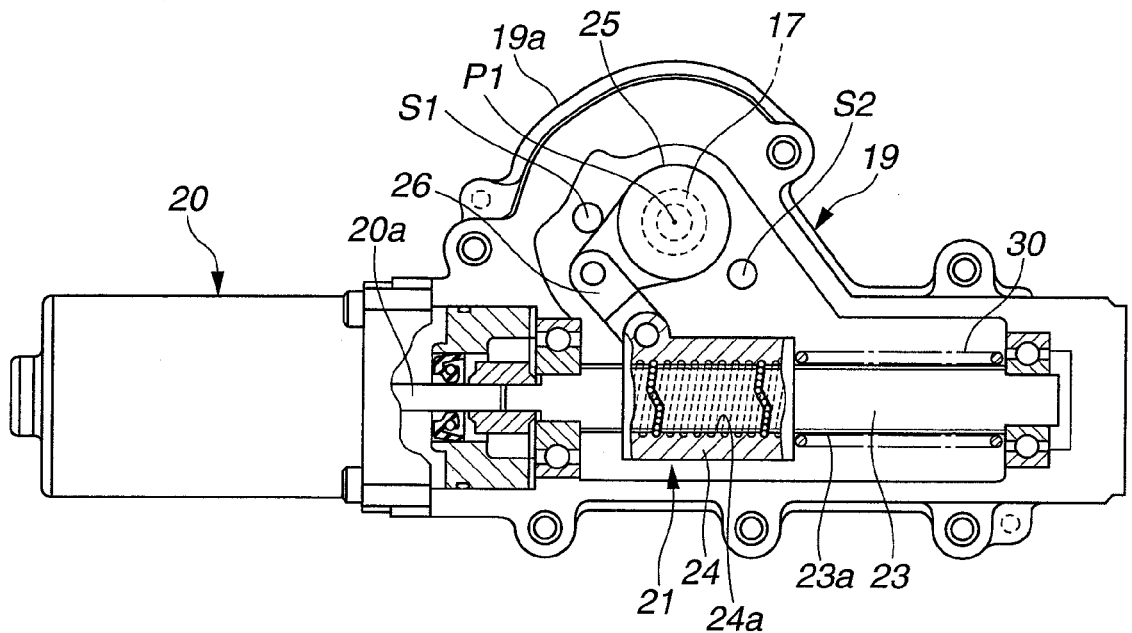
FIGS. 5A and 5B are partially cross sectional views of a drive mechanism used in the first embodiment of the variably operated valve apparatus, FIG. 5A depicting a state in which the drive mechanism is held at a minimum lift position and FIG. 5B depicting a state in which the drive mechanism is controlled at a maximum lift position, respectively.
Figure 5B:
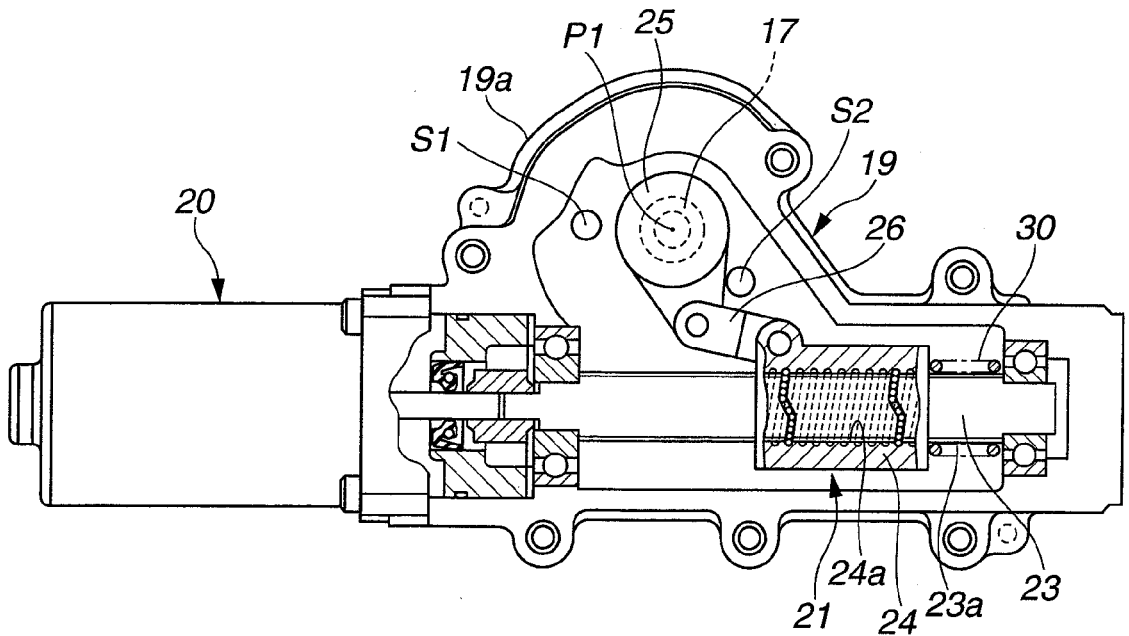

Drive mechanism 19, as shown in FIGS. 5A and 5B, includes: an electrically driven (or electric) motor 20 fixed on one end of a casing 19a; and a ball screw transmitting section 21 installed within an inside of casing 19a to transmit a revolution driving force of electrically driven motor 20 to control shaft 17.

Electrically driven motor 20 is constituted by a proportional type DC motor and is driven in response to a control signal from a controller 22 which is the drive mechanism to detect an engine driving condition.

Ball screw transmitting section 21 mainly includes: a ball screw shaft 23 arranged approximately coaxially on a drive shaft 20a of electrically driven motor 20; a ball nut 24 which is a movement member meshed with an outer periphery of ball screw shaft 23; a linkage arm 25 linked with the outer periphery of ball screw shaft 23; and a link member 26 linking both of linkage arm 25 and ball nut 24.

Ball screw shaft 23 has a ball circulating groove 23a of a predetermined width over a whole outer peripheral surface except both end sections and which is continuously formed in a spiral shape and has one end section which is rotatably driven by means of electrically driven motor 20 linked via a motor drive shaft.

Ball nut 24 is formed approximately cylindrically and a guide groove 24a which rollably holds a plurality of balls is formed in its inner peripheral surface of ball nut 24 continuously in the spiral shape. A rotary motion of ball screw holes 23 is converted into a linear motion to ball nut 24 via each ball. At the same time, a motion force in an axial direction of ball nut 24 is provided for ball nut 24. A spring force of a coil spring 30 which is a biasing section causes ball nut 24 to be biased toward electrically driven motor 20 side (minimum lift side). Hence, at a time of an engine stop, ball nut 24 is moved toward the minimum lift side along an axial direction of ball screw shaft 23 by means of a spring force of coil spring 30.

In addition, control shaft 17 is normally and reversely revolved via a link member 26 along with the forward-and-backward movement of ball nut 24. Each side surface of link member 26 is contacted on a pair of stopper pins S1, S2 projected toward a casing 19a so that normal and reverse rotational positions, namely, the minimum lift (a minimum working angle) and a maximum lift (a maximum working angle) are limited.

Controller 22 is incorporated into an inside of a control unit (ECU) of the engine and detects the present engine driving condition from various kinds of information signals from detection signals of the present engine speed N (rpm) and a crank angle from crank angle sensor 010, an accelerator opening angle sensor, a vehicle speed sensor, a gear position sensor, and cooling water temperature sensor 011, and so forth. Controller 22 receives the detection signal from drive shaft angle sensor 28 detecting a revolution speed of drive shaft 6, the detection signal from a potentiometer 29 detecting the revolution position of control shaft 17 to detect a relative revolution angle of drive shaft 6 to the crank angle and a valve lift and working angle of respective exhaust valves 5, 5.

Hereinafter, a basic operation of exhaust VEL 1 will be described below. When, in a predetermined driving region, a control current from controller 22 causes electrically driven motor 20 to be rotationally driven in one direction and ball screw shaft 23 is revolved in one direction in response to a rotational torque of electrically driven motor 20, ball nut 24 is moved linearly toward a maximum one direction (a direction approaching to electrically driven motor 20) while receiving the assistance of the spring force of coil spring 30 as shown in FIG. 5A. Thus, control shaft 17 is revolved in one direction via link member 26 and linkage arm 25.

Hence, the axial center of control cam 18 is revolved at the same radius about the axial center of control shaft 17 and a thick section of control cam 18 is spaced apart from drive shaft 6 in an upward direction. Thereby, other end section 11b of rocker arm 11 and a pivot point of link rod 13 are moved in the upper direction with respect to drive shaft 6. Thus, a cam nose side of each swing cam 9 is forcefully drawn up so that the whole of each swing cam 9 is pivoted in the clockwise direction shown in FIGS. 3A and 3B.

When rotary cam 7 is revolved so that one end section 11a of rocker arm 11 is pushed up via link arm 12, its lift quantity is transmitted to each swing cam 9, 9 and each valve lifter 8, 8 via link rod 13. Thus, exhaust valves 5, 5 provide small (minimum) lift (L1) as shown in a valve lift curved line of FIG. 6 and provides its small working angle of D1 (the valve open interval in the crank angle). The working angle denotes an interval from the valve open timing of the lift in each exhaust valve 5, 5 to the valve closure timing of the lift in exhaust valve 5, 5.

Figure 3A:
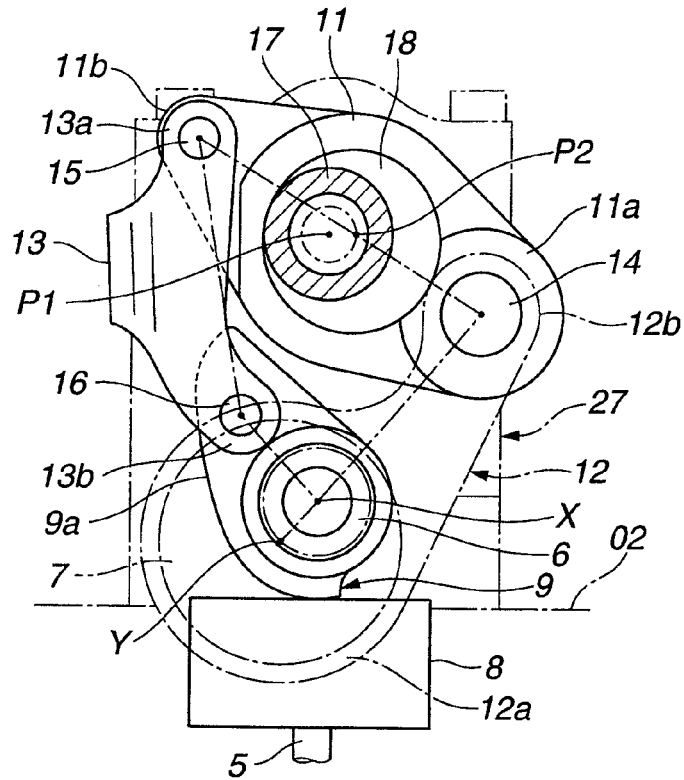
FIGS. 3A and 3B are operation explanatory views of an exhaust VEL mechanism which is the variably operated valve apparatus at a time of a small lift control.
Figure 3B:
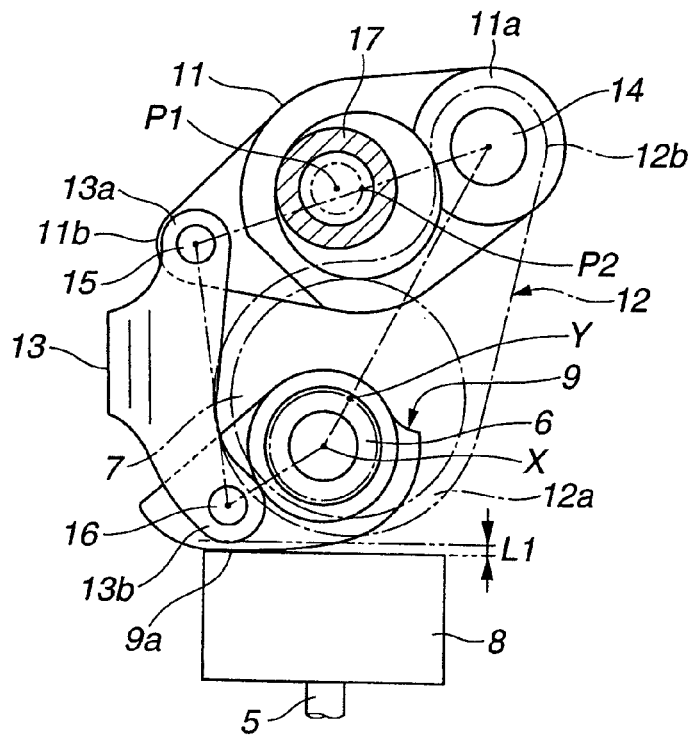

In another driving state, the control signal of controller 22 causes electrically driven motor 20 to be revolved in the other direction. When this revolving torque is transmitted to ball screw shaft 23 and this ball screw shaft 23 is revolved, ball nut 24 is linearly moved by a predetermined quantity in a rightward direction as viewed from FIG. 5A against the spring force of coil spring 30. Thus, control shaft 17 is rotationally driven by a predetermined quantity in the clockwise direction as shown in FIGS. 3A and 3B.

Therefore, the thick section of control cam 18 is moved downward with the axial center of control cam 18 held at a rotational angle position by a predetermined quantity from axial center P1 of control shaft 17. Thus, rocker arm 11 is moved in the counterclockwise direction from the position of FIG. 3B so that the cam nose side of each swing cam 9 is forcefully pushed downward and, then, the whole thereof is slightly pivoted in the counterclockwise direction.

Figure 6:
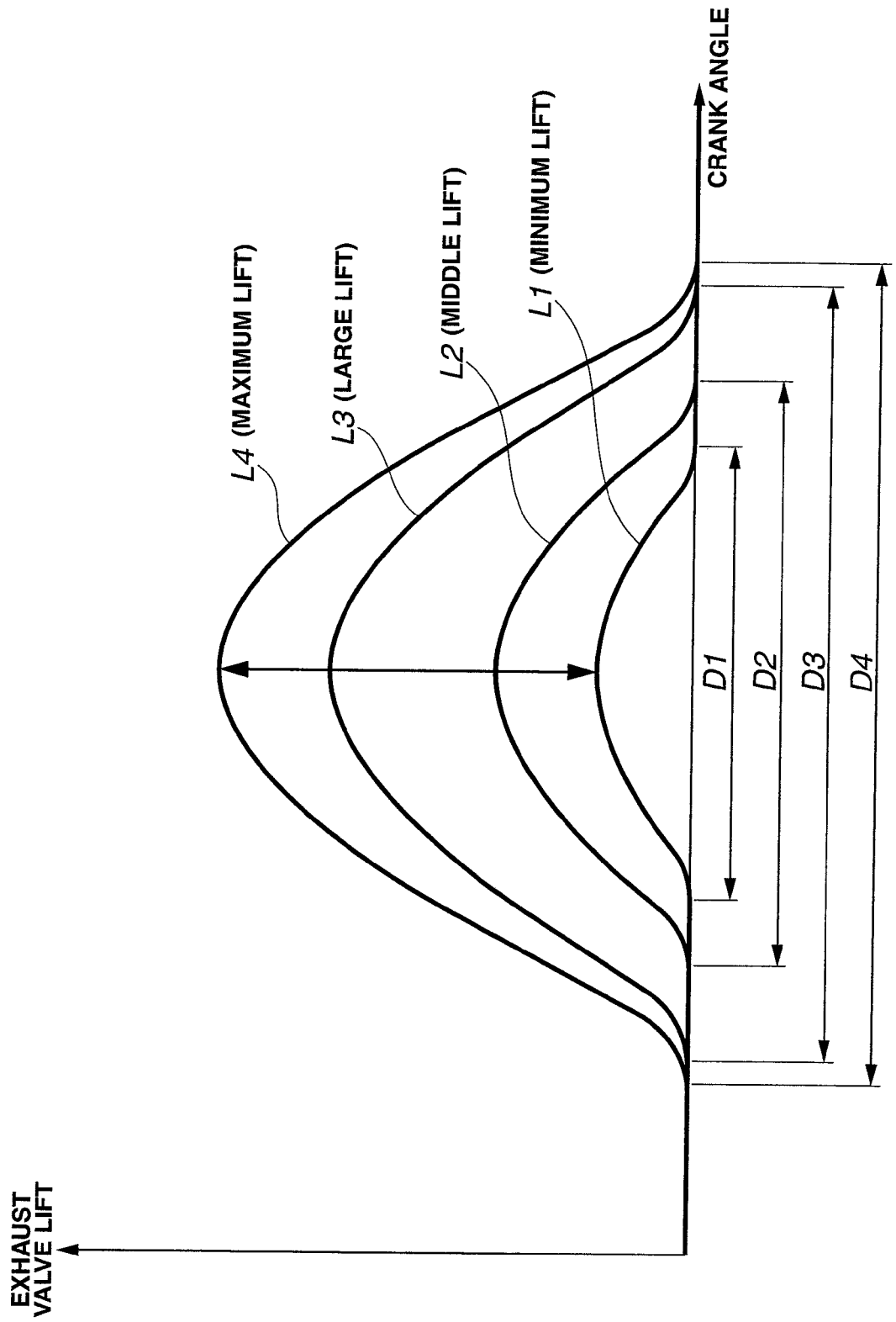
FIG. 6 is a characteristic graph representing a valve lift and a working angle of the exhaust valve in the first preferred embodiment of the variably operated valve apparatus according to the present invention.

Hence, when one end section 11a of rocker arm 11 is pushed upward due to the rotation of rotary cam 7 via link arm 12, its lift (quantity) is transmitted to each swing cam 9 and valve lifter 8. At this time, a valve lift of exhaust valves 5, 5 is transmitted to the lift, as shown in FIG. 6, so as to provide middle lift (L2) or large lift (L3) and the working angle provides as large as D2, D3.

Figure 4A:
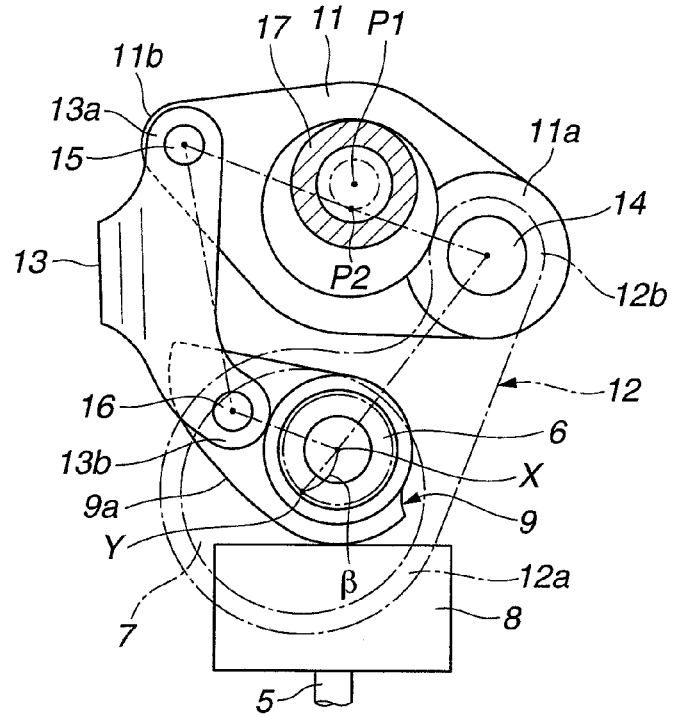
FIGS. 4A and 4B are operation explanatory views of the exhaust VEL mechanism which is the variably operated valve apparatus at a time of a maximum lift control.
Figure 4B:
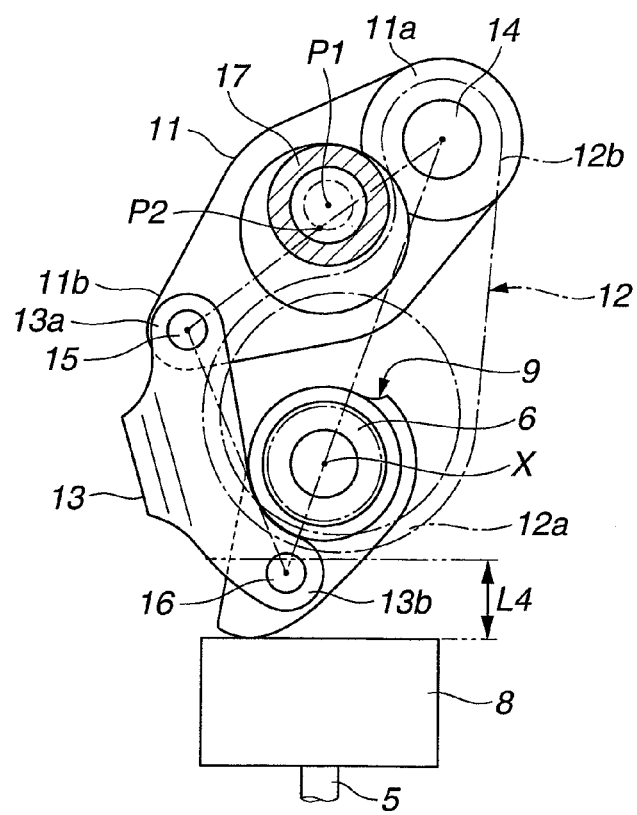

In addition, in a case where, for example, the engine driving region is transferred to a high-speed, high-load region, the control signal from controller 22 causes electrically driven motor 20 to, furthermore, be rotated in the other direction so that ball nut 24 is moved in a maximum rightward direction as shown in FIG. 5B. Thus, rocker arm 11 is moved further in the lower direction, as shown in FIG. 5B. Thus, control shaft 17 is further caused to be rotated in the clockwise direction so that axial center P2 is pivoted furthermore in the lower direction. Thus, whole rocker arm 11 is further moved toward the direction near to drive shaft 6 so that the cam nose to section of each swing cam 9 is pushed downward via link rod 13 so that the whole of each swing cam 9 is pivoted in the counterclockwise direction by the predetermined quantity via link rod 13, as shown in FIGS. 4A and 4B.

When rotary cam 7, thus, is revolved to push is one end section 11a of rocker arm 11 via link arm 12, the lift quantity is transmitted to swing cam 9 and valve lifter 8 via link rod 13. The valve lift becomes increased from L2, L3 to L4 continuously, as shown in FIG. 6. Consequently, an exhaust efficiency at a high revolution region is increased so that an output of the engine can be improved.

In details, the lift quantity of exhaust valves 5, 5 is continuously varied from minimum lift L1, middle lift L2, and large lift L3 to maximum lift L4 in accordance with the driving state of the engine. Hence, the working angle of each exhaust valve 5, 5 is continuously varied from minimum lift of D1 to maximum lift of D4.

In addition, at a time of the engine stop, as described above, ball nut 24 is biased toward electrically driven motor 20 side by means of the spring force of coil spring 30 so as to automatically be moved toward electrically driven motor 20 so as to be stably held at minimum working angle of D1 and minimum lift position of L1 (default position).

Figure 7A:
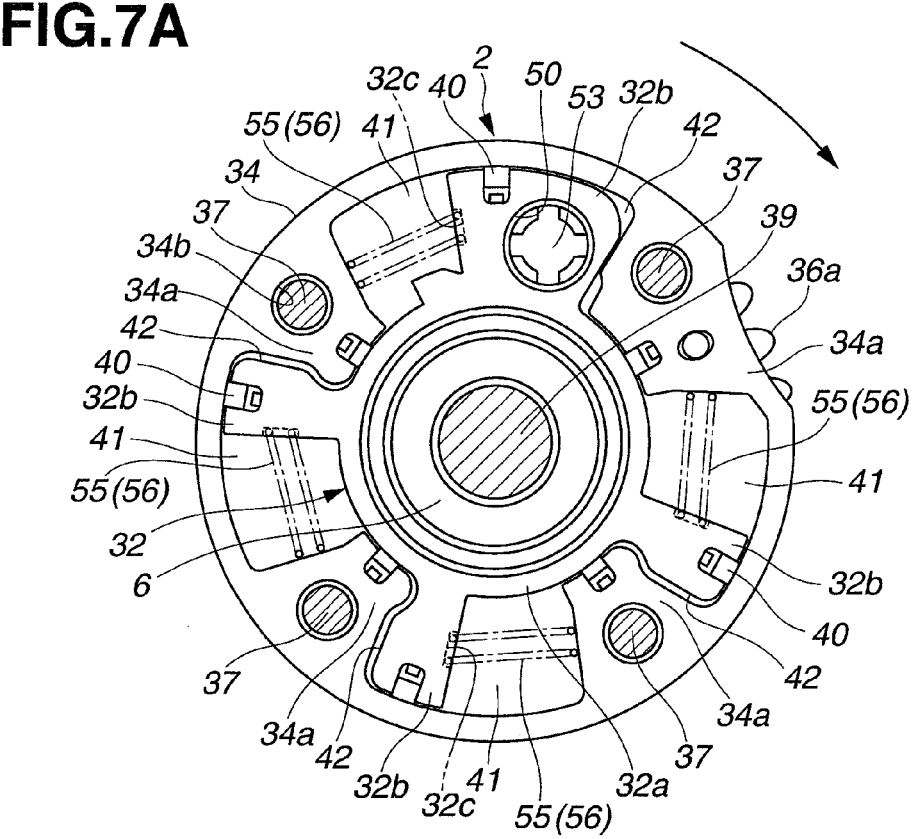
FIGS. 7A and 7B are operation explanatory views representing an essential part of an intake VTC (mechanism) used in the first embodiment of the variably operated valve apparatus, FIG. 7A depicting a maximum advance angle control state and showing a cross sectional view cut away along a line of A-A in FIG. 8 and FIG. 7B depicting a maximum retardation angle control state and showing a cross sectional view cut away along the line of A-A in FIG. 8.
Figure 7B:
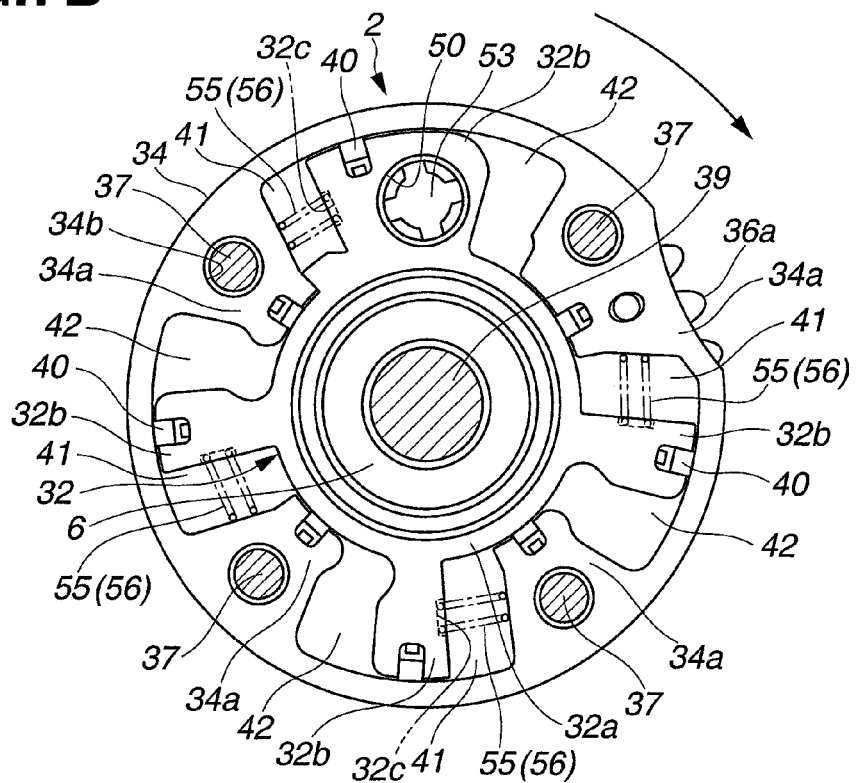
Figure 8:
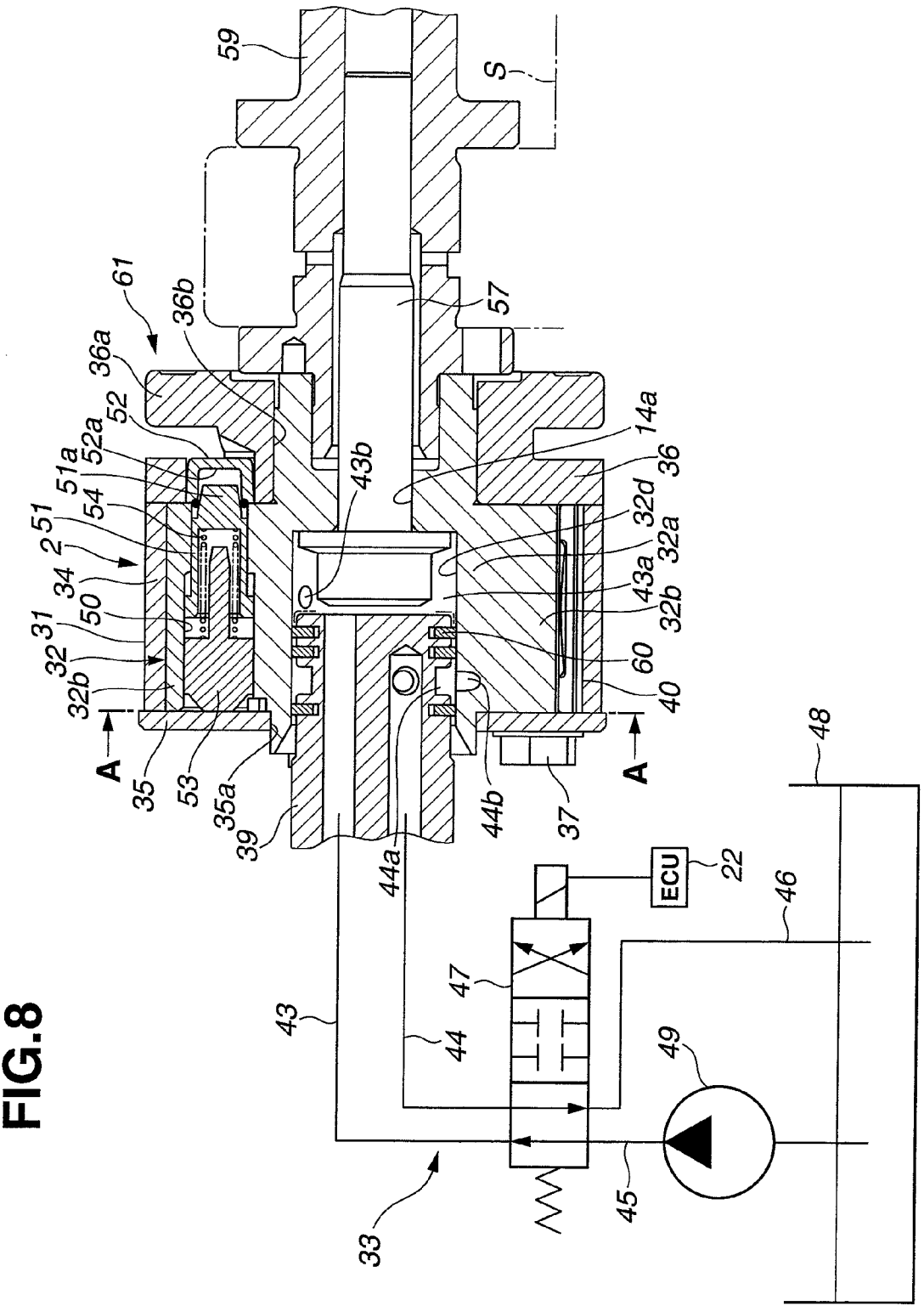
FIG. 8 is a longitudinal cross sectional view of the intake VTC (mechanism) shown in FIGS. 7A and 7B.

Intake VTC 3 is, so-called, of a vane type. As shown in FIGS. 7A, 7B, and FIG. 8, intake VTC 3 includes: a timing sprocket 61 rotationally driven by means of crankshaft 07 of the engine and this rotational driving force is transmitted to an intake valve side camshaft 59; a vane member 32 rotatably housed within timing sprocket 61 and fixed to the end section of intake side camshaft 59; and a hydraulic pressure circuit which normally and reversely rotates vane member 32 according to the hydraulic pressure.

Timing sprocket 61 includes: a housing 34 within which vane member 32 is rotatably housed; an approximately circular plate-like front cover 35 enclosing a front end opening of housing 34; and an approximately circular plate-like rear cover 36 enclosing the rear end opening of housing 34. These housing 34, front cover 35, and rear cover 36 are integrally fixed together from the axial direction of intake side camshaft 59 by means of four small-diameter bolts 37.

The frontward-and-rearward ends of housing 34 is opened and is formed cylindrically and four shoes 34a which are four partitioning walls are projected toward the inner side at an interval of about 9020 along the peripheral direction of the inner peripheral surface of housing 34.

Each shoe 34a has a cross sectional surface of an approximately trapezoidal shape and four bolt inserting holes 34b through which a shank of each bolt 37 is inserted at an approximately center position of each shoe 34a and is penetrated in the axial direction. A letter C shaped seal member 38 and a plate spring (not shown) which presses seal member 38 toward the inner direction of each shoe 34a is fitted and held.

Front cover 35 is formed in a disc plate shape and a supporting hole 35a having a relatively large diameter is fitted at the center of front cover 35. Four bolt holes are provided on respective bolt inserting holes 34b for respective shoes 34a and formed on an outer peripheral surface section of front cover 35.

A gear section 36a of rear cover 36 is integrally disposed on the rear end side of rear cover 36 on which the timing chain is meshed and a bearing hole 36b is at the approximately center position and is penetrated in the shaft direction.

Vane member 32 includes a doughnut shaped vane rotor 32a having a bolt inserting hole at the center thereof and four vanes 32b disposed integrally at 90° is positions on the outer peripheral surface of vane rotor 32a.

In addition, a small-diameter cylindrical section of a front end side of vane member 32 is rotatably supported on supporting hole 35a of front cover 35 and a small-diameter cylindrical section at the rear end side is rotatably supported on bearing hole 36b of rear cover 36.

Vane member 32 is fixed on a front end section of intake side camshaft 59 through an axial direction thereof by means of fixture bolt 57 inserted into the bolt inserting hole of vane rotor 32a from the axial direction of vane member 32.

Three of respective vanes 32b are formed in elongated rectangular shapes having relatively slender and the remaining one of vanes 32b having a large width and formed in a trapezoidal shape. The three vanes 32b have the substantially same width. The width of the remaining one of vanes 32b is set to be larger than the three of vanes 32b and a weight balance of the whole of vane member 32 is taken.

In addition, each vane 32b is disposed between each shoe 34a and a letter C shaped seal member 40 and a plate spring to press seal member 40 toward the inner peripheral surface direction of housing 34 under pressure and which is slidably contacted on an inner peripheral surface direction of housing 34 are respectively fitted and held within an elongated retaining groove formed in the axial direction of each outer surface of each vane 32b. In addition, a recess groove 32c of substantially circular to shape is formed on a side surface of each vane 32b opposite to the revolution direction of intake side camshaft 59.

In addition, four advance angle side hydraulic pressure chambers 41 and four retardation angle side hydraulic pressure chambers 42 are respectively formed between both sides of respective vanes 32b and both side surfaces of respective shoes 34a.

The hydraulic pressure circuit, as shown in FIG. 8, includes two system hydraulic pressure passages of: a first hydraulic pressure passage 43 which supplies and exhausts the hydraulic pressure of the working oil for each advance angle side hydraulic pressure chamber 41; a second hydraulic pressure passage 44 which supplies and exhausts the hydraulic pressure of the working oil to and from respective retardation angle side hydraulic pressure chambers 42. A substantially circular recess groove 32c is formed on one side surface opposite to the revolution direction of intake side camshaft 59. These respective hydraulic pressure passages 43, 44 are connected via an electromagnetic switching valve 47 between a supply passage 45 and a drain passage 46. Above-described supply passage 45 is provided with a one-directional oil pump 49 which pressurizes the oil within oil pump 48 and a downward position of the gear section. A downstream end of drain passage 46 is communicated with electromagnetic switching valve 47 (oil pan 48).

First and second hydraulic pressure passages 43, 44 are formed on an inside of a columnar passage constituting section 39, this passage constituting section 39 having one end inserted within an inner supporting hole 32d from the small-diameter cylindrical section of vane rotor 32a and the other end connected to electromagnetic switching valve 47.

Three annular seal members 60 which partition and seal one ends of respective hydraulic pressure passages 43, 44 are fixedly fitted between the outer peripheral surface of one end section of passage is constituting section 39 and the inner peripheral surface of a supporting hole 14a.

In addition, first hydraulic pressure passage 43 includes: an oil chamber 43a formed on a terminal section of drive shaft 6 side of supporting hole 32d; and four branch passages 43b communicated between oil chamber 43a formed approximately radially in an inside of vane rotor 32a and respective advance angle side hydraulic pressure chambers 41.

On the other hand, second hydraulic pressure passage 44 includes: an annular chamber 44a retained within one end section of passage constituting section 39 and formed on an outer peripheral surface of the one end section; and a second oil passage 44b formed to be bent in an approximately letter L shape within vane rotor 32 and communicated with each retardation angle side hydraulic pressure chamber 42.

Electromagnetic switching valve 47 is of a four-port, three-position type. Each hydraulic pressure passage 43, 44 is relatively switchingly controlled between each hydraulic pressure passage 43, 44 and supply passage 45 and drain passage 46 and is switchingly controlled in response to the control signal from controller 22.

In addition, in a case where no control current is outputted, this electromagnetic switching valve 47 communicates supply passage 45 with first hydraulic pressure passage 43 communicated with advance angle side hydraulic pressure chamber 41 and drain passage 46 with second hydraulic pressure hydraulic pressure passage 44 communicated with retardation angle side hydraulic pressure chamber 42. A coil spring within electromagnetic switching valve 47 serves to form the mechanically related position.

Controller 22 is common to exhaust VEL 1. Controller 22 detects the engine driving condition and detects a relative rotational angle (an actual position of intake VTC 3) of intake camshaft 59 to crankshaft 07 from the detection signal from cam angle sensor 015 detecting the rotational position of intake side camshaft 59 from the detection signal of crank angle sensor 010.

In addition, a lock mechanism which is a restraint section to restrain the revolution of vane member 32 with respect to housing 34 and to release the restraint of vane member revolution is disposed between vane member 32 and housing 34. This lock mechanism is disposed between one of vanes 32b whose width dimension is large (larger than any other vanes) and rear cover 36. This lock mechanism includes: a sliding hole 50 formed along an axial direction of drive axle 6 which is inside of vane 32b; a lock pin 51 in a lid cylindrical shape mounted slidably on an inside of sliding hole 50; an engagement hole 52a mounted on an engagement hole constituting section 52 in a cup shape in cross surface cap fixed on a bottom surface side of sliding hole 50 and engages detachably with a bottom surface side of sliding bottom hole side of sliding hole 50; and a spring member 54 which is held by a spring retainer 53 fixed onto a bottom surface side of sliding hole 50 and which biases lock pin 51 in the direction of engagement hole 52a.

In addition, the hydraulic pressure within to advance angle side hydraulic pressure chamber 41 and hydraulic pressure within oil pump 49 are directly supplied to engagement hole 52a via oil holes not shown.

In addition, tip section 51a of lock pin 51 is engaged with engagement hole 52a by means of the is spring force of spring member 54 at a position at which vane member 32 is rotated at a most advance angle side so that a relative rotation between housing 30 and vane member 32 is locked by lock pin 51. The hydraulic pressure supplied from advance angle side hydraulic pressure chamber 41 and the hydraulic pressure of oil pump 49 cause lock pin 51 to be moved axially in a backward direction so that the engagement of lock pin 51 with engagement hole 52a is released.

A pair of coil springs 55, 56 which are basing members for biasing vane member 32 toward the advance angle side are disposed within an inside of each advance angle side hydraulic pressure chamber 41, namely, between one side surface of each vane 32b and an opposing surface of each shoe 34a opposing against the one side surface of each vane 32b.

In addition, each coil spring 55, 56 is disposed in parallel to each other with an axial distance at which each coil spring 55, 56 is mutually not contacted at a time of a maximum compression deformation and one end section of each coil spring 55, 56 is linked via a thin plate-like retainer (not shown) fitted into a recess groove 32c of vane 32b.

Hereinafter, a basic operation of intake VTC 3 will be explained. At first, when the engine stops, an output of a control current to electromagnetic switching valve 47 from controller 22 is stopped. As shown in FIG. 8, supply passage 45 and first hydraulic pressure passage 43 at the advance angle side are communicated and drain passage 46 and second hydraulic pressure passage 44 are communicated. In addition, in a state in which the engine is stopped, the hydraulic pressure of oil pump 49 is not acted and the supply hydraulic pressure gives 0.

Hence, vane member 32 is, as shown in FIG. 7A, rotationally biased toward the most advance angle side by means of the spring force of each coil spring 55, 56 so that the one end surface of a single wide vane 32b is contacted on the one side surface of one of shoes 34a which opposes against one side surface of a single wide vane 32b. At the same time, when tip section 51a of lock pin 51 of the lock mechanism is engageably inserted into engagement hole 52a so as to stably hold vane member 32 at the most advance angle position. That is to say, the most advance angle position is a default position at which intake VTC 3 is mechanically stabilized.

It should be noted that the default position is a position at which a corresponding mechanism is automatically and mechanically stablized, at a time of non-operation, in other words, in a case where the control signal is not issued and/or in a case where the hydraulic pressure is not generated.

Next, at a time of an engine start, in other words, when the ignition switch is turned on, crankshaft 07 is cranked (cranking revolution) caused by drive motor 09 and the combustion pressure, the control signal is outputted from controller 22 to electromagnetic switching valve 47. However, at a time point of an immediate after this cranking start has started, a discharge hydraulic pressure of oil pump 49 is not sufficiently raised so that vane member 32 is held at the most advance angle side by means of the lock mechanism described above and the to spring force of each coil spring 55, 56.

At this time, in response to the control signal outputted from controller 22, electromagnetic switching valve 47 communicates supply passage 45 with first hydraulic pressure passage 43 and communicates drain is passage 46 with second hydraulic pressure passage 44.

Then, as the cranking is advanced, the hydraulic pressure is supplied from first hydraulic pressure passage 43 to advance angle side hydraulic pressure chamber 41 together with the rise in the hydraulic pressure supplied under pressure from oil pump 49 and the hydraulic pressure from drain passage 46 is opened within oil pan 48 so that the low pressure state is maintained at retardation angle side hydraulic pressure chamber 42 without receiving the hydraulic pressure in the same way as the time of the engine stop.

It should be noted that, after the cranking revolution is raised and the hydraulic pressure is, furthermore, raised, a free vane position control by means of electromagnetic switching valve 47 can be made. In other words, along with the rise in the hydraulic pressure of advance angle side hydraulic pressure chamber 41, the hydraulic pressure within engagement hole 52a of the lock mechanism is increased so that lock pin 51 is moved axially in the backward direction and tip section 51a of lock pin 51 is drawn out from engagement hole 52a to allow the relative rotation of vane member 32 to housing 34. Consequently, it becomes possible to make the free vane position control.

Thereafter, while electromagnetic switching valve 47 is operated in response to the control signal from controller 22 so that supply passage 45 and second hydraulic pressure passage 44 are communicated with each other and drain passage 46 and first hydraulic pressure passage 43 are communicated with each other.

Hence, in turn, the hydraulic pressure within advance angle side hydraulic pressure chamber 41 is returned from drain passage 46 to oil pan 48 so that the hydraulic pressure within advance angle side hydraulic pressure is reduced (to provide a low pressure) and the hydraulic pressure is supplied within retardation angle side hydraulic pressure chamber 42 to provide a high pressure.

Hence, while vane member 32 is revolved in the anticlockwise direction as viewed from FIG. 7B against the spring force of each coil spring 55, 56 due to the high pressure within retardation angle side hydraulic pressure chamber 42 so that vane member 32 is relatively revolved toward a position shown in FIG. 7B. Thus, the relative revolution phase of intake (side) camshaft 59 to timing sprocket 61 (31) is converted toward the retardation angle side. In addition, the position of electromagnetic switching valve 47 is placed at a neutral position to enable an arbitrary relative revolution phase.

Furthermore, the relative revolution phase is continuously varied from the most advance angle (FIG. 7A) to the most retardation angle (FIG. 7B) in accordance with the engine driving state after the engine start.

Exhaust VTC 2 used only in the second embodiment not used in the first embodiment is basically of the vane type in the same manner as intake VTC 3. Briefly explaining, exhaust VTC 2 includes: a timing sprocket 31 disposed on the end section of drive shaft 6 onto which the revolution driving force is transmitted from crankshaft 07; and vane member (not shown) rotatably housed within the inside of timing sprocket 31; and a hydraulic circuit to normally or reversely revolve the vane member by means of the hydraulic pressure.

The hydraulic pressure circuit in the case of exhaust VTC 2 is basically the same as intake VTC 3. However, as is different from three positions (refer to FIG. 8) in the electromagnetic switching valve, the left and right positions are replaced with each other. In addition, the coil spring which biases the vane presses the vane toward the most retardation angle side and the lock position is placed at the most retardation angle side. That is to say, the default position is placed at the most retardation angle side.

This electromagnetic switching valve is switchably operated in response to the control signal from controller 22 in the same way as intake VTC 3.

[Open-and-Closure Timing Control of the Exhaust Valve in the First Embodiment]

Figure 9:
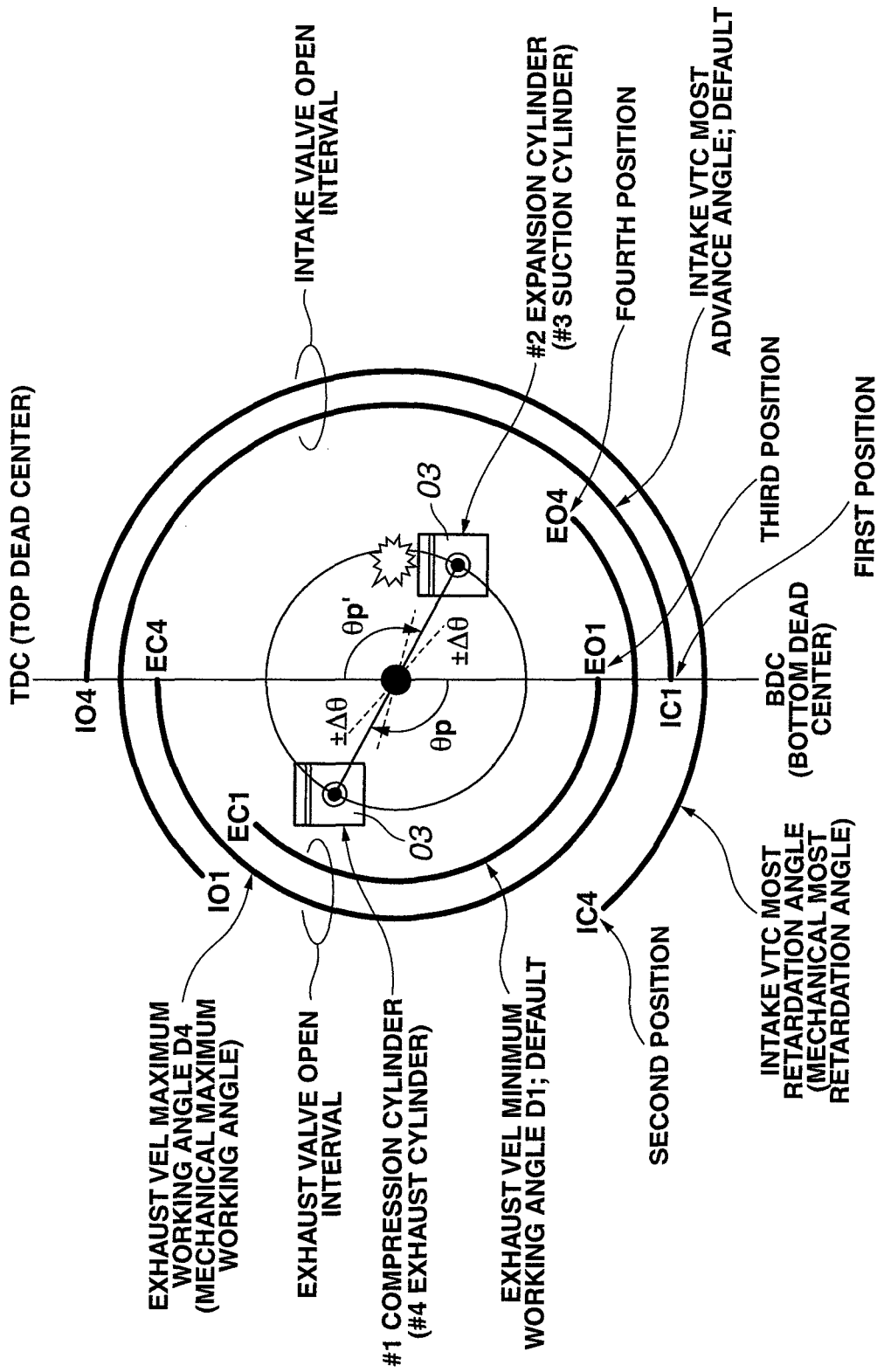
FIG. 9 is a characteristic graph representing a stopped position of a piston in relation to open-and-closure timings of exhaust and intake valves through an exhaust VEL (mechanism) and the intake VTC (mechanism).

FIG. 9 shows the open-and-closure timing of each intake valve 4 and of each exhaust valve 5 in the first embodiment.

Actually, as shown in FIG. 1, although piston 03 is linked to a pin section of crankshaft 07 via connecting rod 06. However, in order to facilitate a better understanding of the position of piston at the time of the engine stop, piston 03 is directly linked to a pin section of crankshaft 07. Even if this is done, there is no problem in a case where the vertical movement of the piston is discussed. In this case, an example in which a first cylinder (#1 cylinder) is in a compression stroke is shown. It should be noted that a cycle sequence is such that #1 cylinder—#3 cylinder—#4 cylinder—#2 cylinder—#1 cylinder and #2 cylinder is in an expansion stroke advanced one cycle than #1 cylinder.

In a case where, at each exhaust valve 5 side, exhaust VEL 1 is used for exhaust valve 5 to be controlled to indicate minimum lift L1 (a minimum operating angle D1), the valve open timing and the closure timing of exhaust valve 5 are at EO1 (a third position), EC1 as is shown in FIG. 9. These open-and-closure timings are the default positions at which exhaust VEL 1 is mechanically stabilized as described above.

Intake VTC 3 described above is a most advance angle phase and the open timing of intake valve 04 and the closure timing thereof are I01 and IC1 (a first position) and provide the mechanically stable default positions. The most retardation angle phase of the open-and-closure timings of intake valve 04 by means of intake VTC 3 is I01 and IC1 by means of exhaust VTC 3 are I04, IC4 (a second position).

Drive motor 09 rotationally controls crankshaft 07 at a time of a transfer into the stop of engine to positionally control piston 03 of second cylinder (#2 cylinder) in the expansion stroke and to positionally control piston 03 of first cylinder (#1 cylinder) toward positions shown in FIG. 9. Thereafter, the engine is stopped.

The crank angle (piston position) of above-described first cylinder (#1 cylinder) of one of cylinders in the compression stroke provides Θ p (retardation angle) larger than 9020 after a piston bottom dead center (BDC). The crank angle of second cylinder (#2 cylinder) which is the expansion stroke cylinder is Θ p' (retardation angle) after a piston top dead center (TDC). In the case of the four-cylinder engine, since a cylinder interval is 180°, θ p'=θ p.

If the engine is left untouched after the stop of the engine, the air is promptly invaded via gap formed between piston 03 and the cylinder bore into each cylinder of #1 cylinder in the compression stroke and #2 cylinder in the expansion stroke in which both of intake valve 04 and exhaust valve 05 are closed. Hence, when the next engine start occurs, the cylinder pressure within both cylinders of #1 and #2 cylinders is at the atmospheric pressure.

[Engine Start Operation]

Next, an operation of the start of engine will be described. Fuel is injected from fuel injection valve 012 into the cylinder of #2 cylinder in the expansion stroke to perform the ignition so that a spontaneous combustion start not dependent upon drive motor 09 pushes down piston 03 of #2 cylinder by means of an initial stage combustion pressure. Consequently, the cranking is started.

It should be noted that the position of piston 03 is slightly directed toward the bottom dead center (θ'p>90°) and the inner cylinder volume (combustion volume) is relatively taken. However, since the combustion is under the inner cylinder atmospheric pressure, a combustion torque is weak (not strong) as compared with the combustion under the ordinary compression pressure and it provides a problem of whether #1 cylinder in the compression stroke can exceed the top dead center at the time of the cranking.

However, a piston initial position of #1 cylinder in the compression stroke is θ>90° which is toward the bottom dead center. Hence, even if the inner cylinder is compressed from the state of the atmospheric pressure to the top dead center, its compression (top dead center inner cylinder pressure) is relatively low (decompression state). Thus, #1 cylinder can easily exceed the top dead center.

If the decompression effect of the same level as described above is carried out using the closure timing of intake valve 04 (IVC), it is necessary to retard IVC up to θ p after the bottom dead center. In addition, in a low-revolution, high-load region required to increase the low-speed torque, it is necessary to place IVC (intake valve closure timing) in the proximity of the bottom dead center.

However, the IVC conversion angle of intake VTC 3 requires approximately θ p, namely, requires a large conversion angle equal to or larger than crank angle of 9020 (4520 in the rotational angle of intake side camshaft 59). It should be noted that a vane conversion angle of 4520 or larger is required in intake VTC 3.

Suppose that the vane conversion angle, in FIGS. 7A and 7B, is increased, for example, to 45°. At a time of the most advance angle, coil springs 55, 56 are closely stuck together in the compression direction thereof at the time of the most advance angle side, the conversion of 45° is impossible. The conversion angle of this angle 4520 without coil springs 55, 56 is difficult from the mechanical layout point of view. In this case, the conversion torque generated due to the conversion hydraulic pressure is reduced and the responsive characteristic becomes worsened, the holding stability becomes worsened, and an excessive load on intake VTC 3 is developed.

Hence, as described in the first embodiment, the decompression is carried out at a position of piston 03 in the compression stroke. A problem such as a large conversion angle of the closure timing (IVC) of intake valve 04 can be avoided.

In addition, the crank angle position of piston 03 of θ p after the bottom dead center (the position of piston 03 of #1 cylinder in the compression stroke) is sufficiently retarded with respect to the intake valve closure timing IC1 (first position) which is the IVC crank angle at the time of engine stop. If θ p±Δθ in the θ p control by means of drive motor 09 which is a crank angle position control section, the position of θ p is not advanced than IC1 (first position) even if a deviation occurs. Hence, without influence of IVC, the decompression is carried out according to the position of piston 03 of #1 cylinder in the compression stroke at the time of engine stop. Hence, the compression can be stabilized and a stable rise of the initial (stage) cranking can be achieved.

It should be noted that, since IC1 (first position) is the default position mechanically stable before the engine start, the above-described effect can be obtained from an instantaneous time at which the engine start is initiated.

In addition, if a failure in an electrical system such as a line breakage of, for example, intake VTC 3 occurs, IVC takes above-described IC1 and the effect of revolution rise of the stable initial stage cranking can be obtained.

On the other hand, an erroneous operation (a control abnormality) of intake VTC 3 without line breakage will be considered as will be described below. Suppose a case where IVC is maximally retarded to a mechanically most retardation angle position IC4 (second position). As shown in FIG. 9, the IVC is not delayed up to a compression stroke cylinder piston position (Θ p). Hence, without receiving the influence of the IVC, the decompression control according to the compression stroke cylinder piston position at the time of the engine stop can be made. The stabilization of compression can, thus, be achieved and the stable rise in the initial stage cranking revolution can be obtained.

Next, an operation of #2 cylinder in the expansion stroke which is the combustion cylinder at the initial stage will be described.

As described above, a spontaneous combustion start causes piston 03 in #2 cylinder to be pushed downwardly under the initial stage combustion pressure to initiate the cranking.

However, the position of piston 03 is slightly directed toward the bottom dead center (θ p>90°) and the inner cylinder volume (a combustion volume) becomes relatively larger but the inner cylinder pressure is at the atmospheric pressure. Hence, the combustion of fuel is not sufficient (weak or not strong) as compared with the case of combustion under an ordinary compression pressure.

Therefore, to obtain the favorable combustion, as shown in FIG. 9, the valve open timing (EVO) of exhaust valve 05 is retarded to an angle placed over EO1 (third position) placed in the proximity to the top dead center. Thus, the timing at which the combustion pressure is drawn out from the valve opening timing of exhaust valve 05 is delayed so that, when piston 03 is moved in the downward direction, the combustion pressure can be acted continuously up to the bottom dead center for a long term. Thus, when piston 03 is moved in the downward direction, the combustion pressure can be acted for the long term up to the proximity to the bottom dead center so as to be converted to the torque of the crankshaft. This EO1 (third position) is the default position at which VEL 1 is mechanically stable. Hence, since EO1 is placed previously before the initial combustion is started, the above-described effect can be obtained from the instantaneous time of the engine start initiation (initial combustion start).

In addition, even if the failure such as the breakage occurs in the electrical system of exhaust VEL 1, EVO is EO1 so that a rise effect of the stable initial cranking can be obtained.

On the other hand, an erroneous operation (control abnormality) of exhaust VEL 1 not the breakage of the electrical system will be considered as will be described below.

Even if the open timing of exhaust valve 05 is advanced at maximum to EO4 (a fourth position) (the most advance angle), the piston is not advanced to a position (θ' p) of second #2 cylinder in the expansion stroke, as shown in FIG. 9. Hence, an interval from a time at which piston 03 is started moving to a time at which the combustion pressure is opened due to an open operation of exhaust valve 05 can be secured to some degree. Although the engine torque drops to some degree, the engine torque can be secured to some degree. Hence, the startabilty can be secured at minimum.

Next, #1 cylinder (cylinder in the compression stroke at the time of engine stop) which provides the cylinder to be combusted at the next to #2 cylinder which is in the expansion stroke which is the initial combustion cylinder will be considered as will be described below.

When the initial cranking is initiated at the first time combustion, the initial (stage) cranking is quickly raised due to the effect of the stable decompression effect according to θ p in first cylinder (#1 cylinder) and the effect of open timing delay (EO1) of exhaust valve 05.

Then, immediately after #1 cylinder is transferred to the expansion stroke passing the top dead center, the fuel injection and ignition are performed to provide a second combustion.

The second combustion has the in-cylinder air volume smaller than #2 cylinder at the time of engine stop. However, the inner cylinder pressure at the compression stroke top dead center is higher than the atmospheric pressure and the crank angle at which the combustion is started is advanced. Hence, an axial torque equal to or larger than the first combustion can be generated.

3 cylinder (combustion stop suction stroke cylinder) which is combusted subsequently to #1 cylinder is in the suction stroke at the time of the engine stop before the start. When the cranking is initiated, piston 03 of #3 cylinder which is placed in the vicinity of the intermediate state between the top dead center and the bottom dead center is started to fall down. At a time point at which piston 03 of #3 cylinder becomes approximately placed at the bottom dead center, intake valve 04 is closed. Since the engine speed is sufficiently low and the charging efficiency of fresh air becomes maximum at the bottom dead center of IVC, the fresh air can sufficiently be introduced. Then, #3 cylinder generates the sufficient combustion torque to raise the engine revolution.

One of the remaining cylinders which is combusted subsequently to #3 cylinder which is in the suction stroke at the time of engine stop is #4 cylinder which is in an exhaust stroke at the time of engine stop. This #4 cylinder is in the exhaust stroke at the time of the engine stop before the start. When the cranking is started, air in #4 cylinder is exhausted. When the air within the cylinder is exhausted and the stroke is subsequently transferred to the suction stroke, fresh air is inspired (sucked) from intake valve 04. It should be noted that the open timing of intake valve 04 in #4 cylinder (IO1) is before the top dead center. However, there is almost no overlap between the closure timing EC1 of exhaust valve 05 and open timing IO1 of intake valve 04. Hence, a re-suction (re-inspiration) of exhaust gas exhausted from each of #2 cylinder, #1 cylinder, #3 cylinder is suppressed. In addition, since the fresh air is inspired from the position of piston placed in the proximity of the top dead center of the piston, the fresh air is sufficiently sucked to the air charge quantity equal to or larger than #3 cylinder. Hence, the combustion torque is increased and the engine speed can, furthermore, be increased.

One of the remaining cylinders which is combusted subsequently to #4 cylinder is #2 cylinder and the second (time) combustion occurs after the initial stage spontaneous combustion. This combustion pattern is the same as that of #4 cylinder and the combustion torque equal to #4 cylinder and the engine speed are maintained. As described above, a favorable startablity can be realized.

Figure 10:
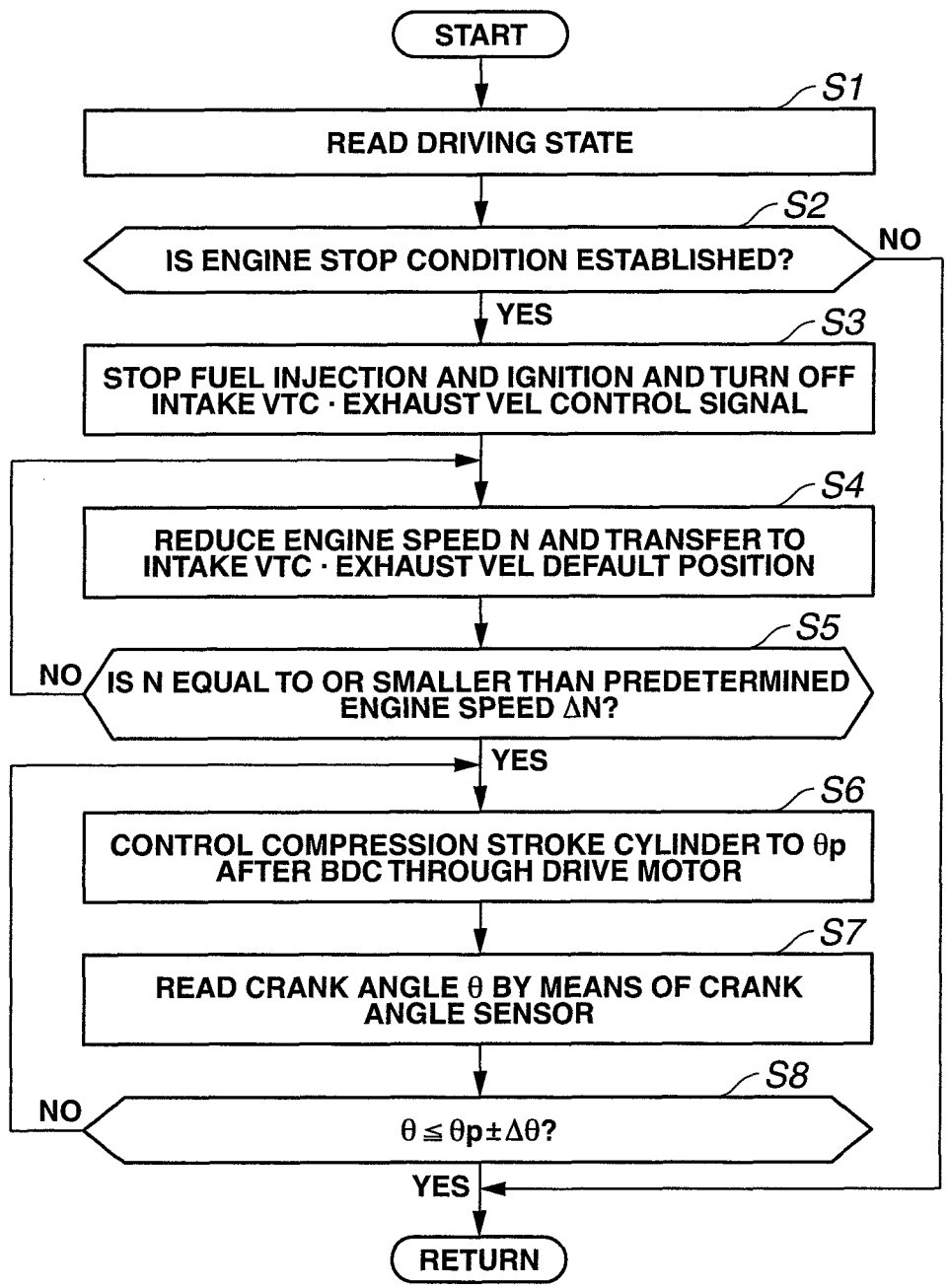
FIG. 10 is a flowchart representing a control over an engine to a stop of the engine by means of a controller in the first embodiment of the variably operated valve apparatus.

FIG. 10 shows a control flowchart executed by controller 22 until the engine is stopped in the first embodiment.

At a step S1, controller (ECU) 22 reads the present engine driving state from various kinds of sensors described above to determine whether a stop condition of the engine is established at a step S2. That is to say, controller 22 determines whether such a condition of an engine temperature that an engine idling stop is established when the engine is stopped. If controller 22 determines that it is not under the engine stop condition (No), the routine is returned. However, if controller 22 determines that the engine is in the engine stop condition (engine strop condition is established) (Yes), the routine goes to a step S3.

At step S3, controller (ECU) 22 stops the fuel injection and the spark so that the control signal for each of exhaust VEL 1 and intake VEL 3 is turned off.

Consequently, at a step S4, controller (ECU) 22 decreases engine speed and exhaust VEL 1 and intake VTC 3 are mechanically transferred to default positions (IO1, IC1, EO1, EC1) by means of the spring forces of the respective coil springs 30, 55, 56.

At a step S5, controller 22 determines whether engine speed N is equal to or lower (smaller) than Δ N. If determines that engine speed N is equal to or higher than predetermined engine speed Δ N (Yes), the routine returns to step S4. If engine speed N is below predetermined engine speed N (No), controller 22 determines that the engine is about to stop and the routine goes to a step S6 (this case includes a case where the engine speed is in the reverse direction (a sign is minus)).

In this step S6, the control current is supplied to drive motor 09 and the positioning control is carried out while the rotational position of crankshaft 07 by means of crank angle sensor 010 is monitored so that the piston position (crank position) of the cylinder in the compression stroke provides θ p after the bottom dead center.

At the next step S7, controller 22 reads crank angle θ of actual crankshaft 07 by means of crank angle sensor 010 and the routine goes to a step S8.

At step S8, controller 22 determines whether crank revolution angle θ falls within a range of θ p±Δ θ.

In a case where crank revolution angle θ falls within the above described range (Yes) at step S8, control is ended. However, in a case where crank revolution angle θ does not fall within this range, the routine again returns to step S6 to control drive motor 09. If this cycle is repeated by several cycles, crank revolution angle θ falls within this range.

Figure 11A:
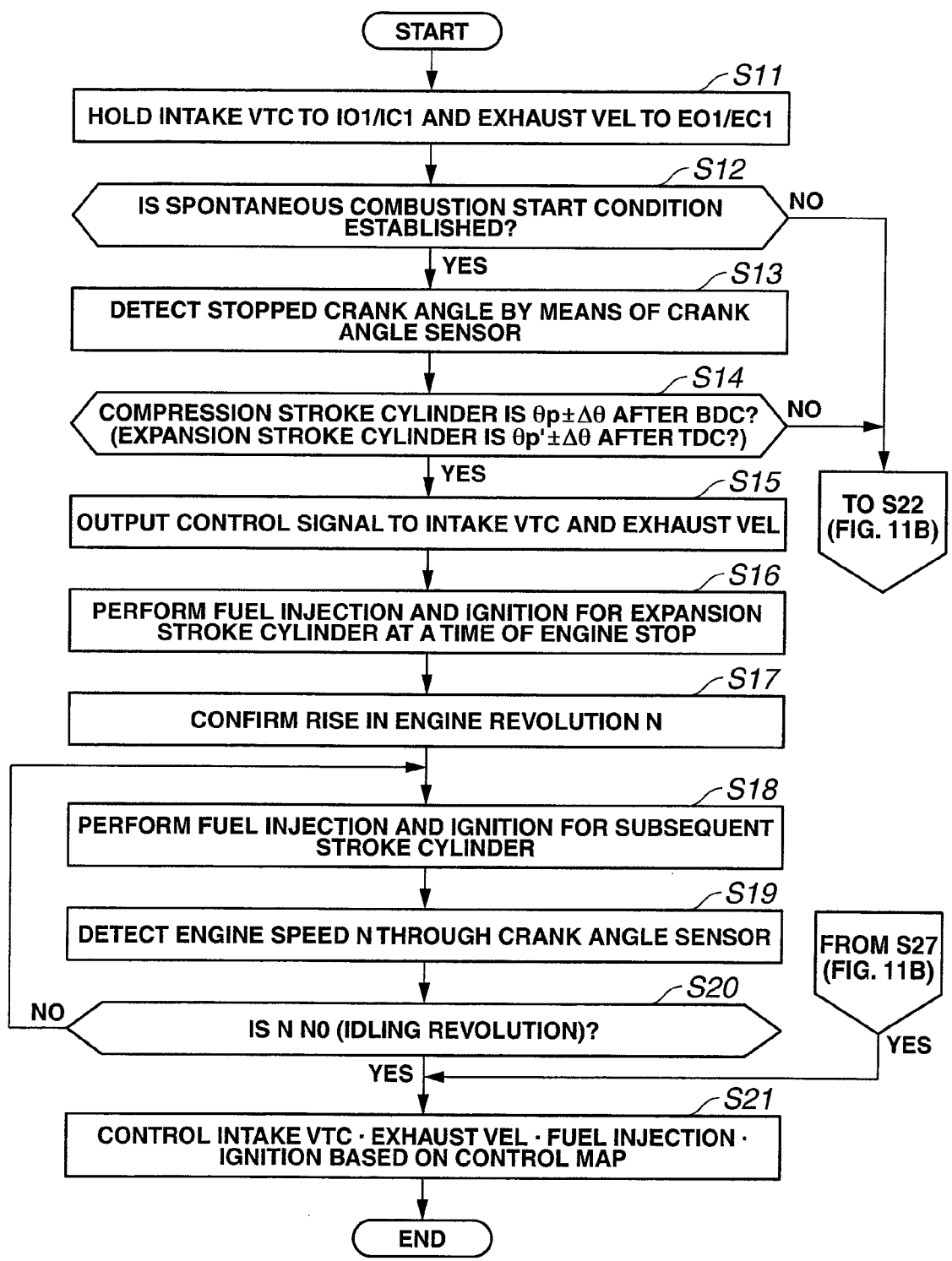
FIGS. 11A and 11B are integrally a control flowchart at a time when the engine is started by means of the same controller.
Figure 11B:
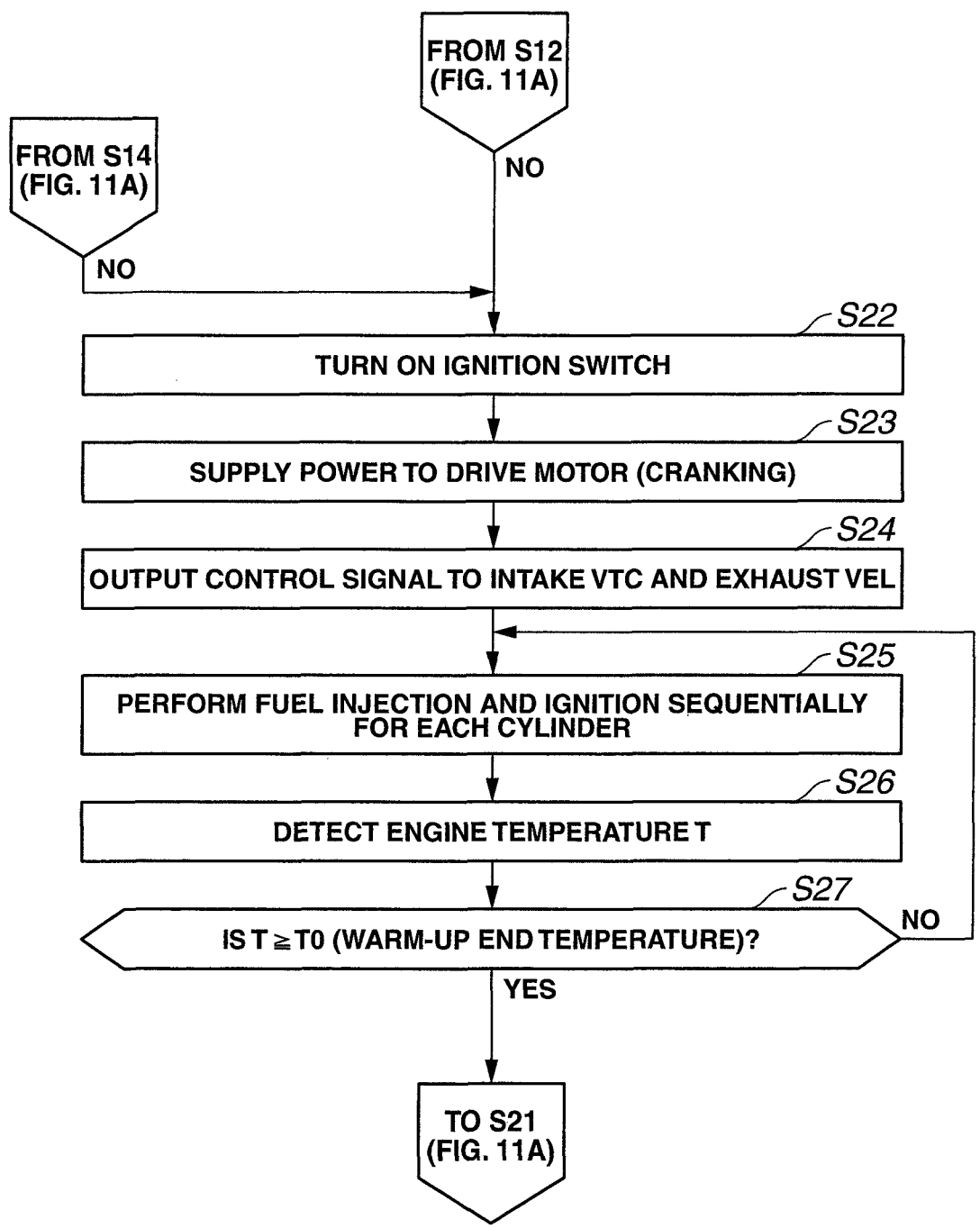

FIGS. 11A and 11B integrally show a control flowchart executed by controller 22 at the time of the engine start in this preferred embodiment.

At a step S11, controller 22 mechanically holds the open-and-closure timings of exhaust valve 05 by means of exhaust VEL 1 and intake valve 04 by means of intake VTC 3 at default positions in EO1, IO1, IC1 respectively as shown in FIG. 9.

At a step S12, controller 22 determines whether the present engine state is the start condition due to the spontaneous combustion with the engine temperature as one of the parameters. For example, in a case where a cold start is carried out, a combustion failure is easy to occur and the friction of the engine is large. Hence, controller 22 determines that it is impossible to perform the cranking due to the spontaneous combustion and the routine goes to a step of an ordinary start described hereinbefore. In a case where controller 22 determines that the spontaneous combustion start condition is established in a case of the engine warm-up state. In a case where controller 22 determines that the spontaneous (or autonomous) combustion start condition such as the warm-up state of the engine is established, the routine goes to a step S13.

At step S13, controller 22 issues a command to crank angle sensor 010 to detect an actual crank angle of crankshaft 07, namely, a stop position of piston 03. Then, the routine goes to a step S14.

At step S14, controller 22 determines whether the present crank angle provides the crank angle through which the spontaneous combustion start can be carried out. That is to say, controller 22 determines whether the cylinder in the compression stroke falls within a range of θp±Δ θ after BDC (determines whether the cylinder in the expansion stroke falls within a range of θ p'±Δθ after BDC). It should be noted that, if controller 22 determines that the above-described cylinder is out of the range described above (No) at step S14, the routine goes to an ordinary start step (S22 in FIG. 11B) but determines that the above-described cylinder is in the range described above (Yes) at step S14, the routine goes to a step S15.

At this step S15, controller 22 issues a command to exhaust VEL 1 and intake VTC 3 to output control signals for the valve open-and-closure timings of exhaust valve 05 and intake valve 04 to be converted to the default positions of EO1, EC1 and to default positions of IO1, IC1, respectively.

This control procedure has the meaning of correction when the valve open-and-closure timings of the exhaust valve and the intake valve at step S11 are not mechanically sufficiently stable at default positions and a case of a slight deviation from a target for the left-open interval thereafter. In addition, this control procedure has the meaning of holding not separated from the default position due to the vibration.

At the next step S16, controller 22 performs the fuel injection and the ignition control for one of the cylinders in the expansion stroke to start the spontaneous combustion (initial (first time) spontaneous combustion). The valve open-and-closure timings of intake valve 04 and exhaust valve 05, at this time, are suitable for the spontaneous combustion as described above.

Upon the confirmation that engine revolution N has risen at step S17, the routine goes to a step S18 in which the fuel injection and the ignition control are performed sequentially at the subsequent cylinders.

Thereafter, at a step S19, controller 22 issues a command to detect the present engine speed N through crank angle sensor 010 and the routine goes to a step S20.

At step S20, controller 22 determines whether engine speed N has risen to idling speed (revolution) NO. If determines no rise in engine speed N to idling speed NO, the routine is returned to step S18. However, if controller 22 has risen to NO, the start phase is determined to be ended and the routine goes to a step S21.

At step S21, controller 22 controls exhaust VEL 1 and intake VTC 3 and performs controls of the fuel injection quantity and the ignition timing.

On the other hand, in a case where controller 22 determines, at step S12, for example, that the engine is in the cold start, the routine goes to a control of an ordinary start. In this case, at a step S22, when the ignition switch is turned on, the cranking is started with the electric power supply to drive motor 09. In other words, it is disadvantageous in terms of noise and start time. However, a start pattern which is advantageous in terms of the start reliability is selected.

At a step S24, controller 22 outputs the control signal such that the open-and-closure timings of exhaust valve 05 and intake valve 04 are converted into default positions (EO1, EC1, IO1, IC1), respectively.

It should, herein, be noted that, since no necessity of the spontaneous combustion start is risen, the control signal which converts the valve open-and-closure timings of exhaust valve 05 into a slightly large working angle D2 (EO2, EC2) of exhaust VEL 1 may be outputted to generate the valve overlap, thus, the exhaust emission being reduced.

Then, at the next step S25, controller 22 performs the combustion control of the fuel injection and the ignition for each cylinder on a basis of the ignition order to promote the warm-up of the engine. At the next step S26, controller 22 detects an engine temperature T through the coolant temperature sensor. Then, at a step S27, controller 22 determines whether engine temperature T is equal to or higher than a predetermined warm-up end temperature T0.

If, at step S27, controller 22 determines that T<T0 (No), the routine goes to step S25. At step S25, controller 22 performs the fuel injection and the ignition timing control for each cylinder in a state of the default position. If determines that T≥T0, the routine goes to step S21 at which controller 22 performs the ordinary control using the control map.

As described above, in this embodiment, the inner cylinder compression at the time of the spontaneous combustion start is determined according to the control position of controllable piston 03, not depending upon the position of IVC of intake valve 04. Hence, the variation (dispersion) of the inner cylinder compression can be suppressed and the rise in the initial (stage) cranking can always be obtained.

It should be noted that drive motor 09 may be used together not only by the pure spontaneous combustion start. If this is done, the reliability of the engine startablity can, furthermore, be increased.

In addition, since it becomes unnecessary to excessively enlarge the conversion angle of the closure timing of intake valve by means of intake VTC 3, the load on the intake VTC 3 can be relieved and this permits the suppression of the reduction in the response characteristic.

Furthermore, even if the failure of the electrical system of intake VTC 3 occurs, IVC is mechanically held at the first position. Hence, IVC is mechanically held at the first position, the rise characteristic of cranking at the initial stage of engine start becomes favorable, and the stable startability can be secured.

It should be noted that this embodiment is the application to the idling stop vehicle but it is possible to apply the start of a, so-called, hybrid vehicle in which a drive source is switched between the electrically driven motor and the internal combustion engine. In this case, in place of drive motor 09, an electrically driven motor (electric motor) may be used for the hybrid vehicle It should also be noted that the valve timing such as IVC, EVO, and so forth is, truly, a timing of lift end through lift start but may be a timing of lift end through lift start except a ramp interval of a minute lift. In a latter case, the valve timing corresponds to a substantial open-and-closure timing with a substantial stream of air taken into consideration. Hence, a substantial effect of the present invention is large.

(Second Embodiment)

Figure 12:
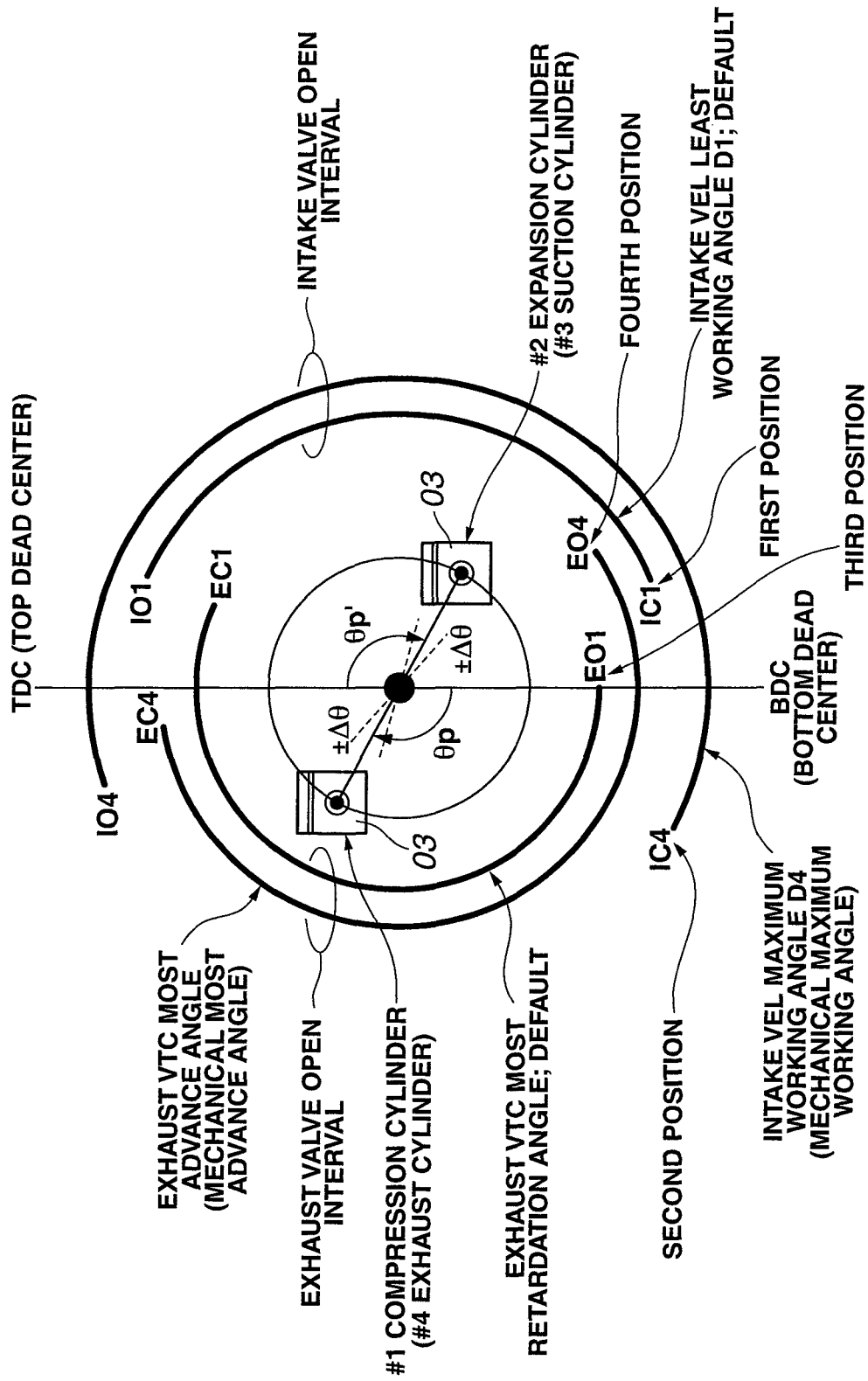
FIG. 12 is a characteristic graph representing a stopped position of the piston in relation to the valve open-and-closure timings of the exhaust valve and intake valve by means of exhaust VTC (mechanism) and intake VEL (mechanism) in a second preferred embodiment of the variably operated valve apparatus according to the present invention.

FIG. 12 shows the open-and-closure timings of each intake valve 4 and each exhaust valve 5 and the position of piston 03 at the time of the engine stop in a second preferred embodiment. #1 cylinder is in the compression stroke and #2 cylinder is in the expansion stroke. It should be noted that the cycle order is the same as the first embodiment.

Then, from the mechanism point of view, VEL 1 installed at the intake side that is mounted at the exhaust side in the first embodiment is mounted at the intake side. The default position at intake VEL in the second embodiment is the minimum working angle D1 in the same way as the first embodiment and the open-and-closure timings of each intake valve 04 are IO1, IC1. In addition, the maximum working angle mechanically controlled is D4 and provides IO4, IC4.

In addition, intake VTC 3 attached onto the intake side is eliminated and exhaust VTC 2 is attached to the exhaust side. As is different from intake VTC in the first embodiment, in the second embodiment, exhaust VTC 2 provides the most retardation angle side for the default position as described before. In other words, in the first embodiment, the most advance angle side is provided for the default position but, in the second embodiment, exhaust VTC 2 provides the most retardation angle for the default position. In more details, in the second embodiment, bias springs 55, 56 in FIG. 7 in the first embodiment push vane member 32 toward the most retardation angle side but not toward the most advance angle side. Hence, the default positions of the open-and-closure timings of exhaust valve 05 are EO1, EC1 at the most retardation angle side.

In this second embodiment, use is made for the ordinary start by means of drive motor 09 not the spontaneous combustion start as in the case of the first embodiment. As shown in FIG. 12, the stop position of piston 03 is in the same way as the first embodiment. In details, although the stop position of piston 03 of one of the cylinders in the compression stroke provides θ p after the bottom dead center, default IC1 (first position) is sufficiently at the advance angle side and the compression of piston 03 in the compression stroke is determined only by θ p without receiving of the influence of the closure timing (IVC) of intake valve 04, in the same way as the first embodiment. Hence, a stable revolution rise effect when the cranking is carried out through drive motor 09 can be obtained.

Since, in the second embodiment, IVC is, furthermore, advanced, the following effect can be obtained.

That is to say, when piston 03 in the subsequent cylinder is transferred to the suction stroke passing the exhaust stroke top dead center, the fresh air is inspired at an interval from IO1 to IC1 and IC1 is advanced from bottom dead center. Thus, the effective compression ratio and intake air charging efficiency are slightly reduced according to the decompression effect of the earlier closure of, so-called, IVC are slightly reduced. Then, a silent combustion and an appropriate combustion torque can be obtained. Since the working angle is small, a variably operated valve friction is low and a low-noise smooth revolution rise according to the decompression effect in the subsequent cylinder described before can be obtained.

In addition, since IC4 which is mechanically most retardation angle IVC by means of intake VEL is advanced than θ p, the compression of the cylinders in the compression and suction strokes is determined only by Θ p without receiving the influence of IVC of intake valve 04 even if the intake VEL is erroneously operated. Hence, a favorable rise in the initial stage revolution can be obtained.

Furthermore, default EO1 (third position) by means of exhaust VTC2 is placed at the retardation angle side. Hence, at the time of the start combustion at which the engine speed is low, an early slipping out of the combustion pressure is suppressed. Even in a case where the ordinary start without the spontaneous combustion start, a drop of the engine torque can be suppressed.

It should be noted that although, in this embodiment, only VEL is attached onto the intake side, VTC in which the default position is for the most advance angle may be installed together with the same VEL. In this case, IC1 can, furthermore, be advanced.

On the other hand, in a large working angle area, VTC is controlled to the retardation angle side so that it is possible to suppress a variation in IVO of intake valve 04 (a variation of valve overlap) and to stabilize an inner cylinder residual gas quantity The present invention is not limited to the structure of each preferred embodiment but various changes and modifications may be made without departing from the scope and sprint of the present invention.

The applied internal combustion engine is four cylinders (cylinder interval is 720°/4=180°) and, in FIGS. 9 and 12, θ p'=θ p.

However, the present invention is applicable to the engine having the number of cylinders except four cylinders. For example, if the number of cylinders are six cylinders (cylinder interval is 720°/6 =120°). θp'=θ p–60°. If the cylinder interval is 120 ° of three cylinders, θ p'=θ p+6 O°. In order words, considering θ p and IVC of intake valve 04, the same thing is resulted.

The technical ideas of the present invention that can be grasped from the above-described embodiments will be described below.

(1) The variably operated valve apparatus of the internal combustion engine as set forth in claim 1, wherein the first position of the closure timing of the intake valve is placed at a position more advance angle side than the most advance angle position within a control range of the stop position of the piston of the cylinder in the compression stroke.

According to the present invention described in item (1), the compression is not affected by the influence of the intake valve closure timing and the stable revolution rise of the initial (stage) cranking can be obtained.

(2) The variably operated valve apparatus of the internal combustion engine as set forth in claim 1, wherein the first position of the closure timing of the intake valve is placed in the proximity of a piston bottom dead center.

According to the present invention described in item (2), the intake air charging efficiency can sufficiently be increased and the combustion torque can be augmented. Hence, the engine revolution can quickly be raised according to the increase in the torque at one of the cylinders subsequent to the combusted cylinder after the stable rise in the revolution of the initial (stage) cranking. Thus, the further shortening of the start time can be achieved.

(3) The variably operated valve apparatus of the internal combustion engine as set forth in claim 1, wherein the first position of the closure timing of the intake valve is placed at a position more advance angle side than a piston bottom dead center.

According to the present invention described in item (3), the effective compression ratio and intake air charging efficiency are slightly reduced and silent combustion and appropriate combustion torque can be obtained. As a result of this, the reduction in the noise and smooth revolution rise in the subsequent cylinder subsequently to the stable revolution rise in the initial (stage) cranking can be obtained.

(4) The variably operated valve apparatus of the internal combustion engine as claimed in claim 1, wherein the variably operated valve apparatus includes a mechanism which is capable of variably controlling an open timing of an exhaust valve and, at the time of the engine stop, an open timing of the exhaust valve is held at a third position at a retardation angle side.

According to the present invention described in item (4), during the start combustion at which the engine speed is low, the drop of the engine torque can be suppressed by delaying the timing at which the combustion pressure is opened due to the open operation of the exhaust valve.

(5) The variably operated valve apparatus of the internal combustion engine as set forth in item (4), wherein the mechanically most advance angle position of the open timing of the exhaust valve is a fourth position at a more retardation angle side by a predetermined quantity than the stop position of the piston at the cylinder in the expansion stroke at the time of the engine stop.

According to the present invention described in item (5), even if the variable mechanism is erroneously operated so that the open interval of the exhaust valve is placed at the most retardation angle side, at the time of the start combustion at which the engine speed is low, the time interval to the time at which the combustion pressure is opened by the open operation of the exhaust valve can be secured to some degree and the engine torque can be secured at minimum although the engine torque drops. Thus, the startability can be assured at minimum.

(6) The variably operated valve apparatus for use in the internal combustion engine as set forth in claim 1, wherein, at a time of no control, at least the closure timing of the intake valve is mechanically stable at a most advance angle position and the mechanically stable position is the first position.

(7) The variably operated valve apparatus for use in the internal combustion engine as set forth in claim 2, wherein a spring member is disposed in order for at least the closure timing of the intake valve to be mechanically stable at the most advance angle position, at the time of no control.

(8) The variably operated valve apparatus for use in the internal combustion engine as set forth in claim 3, wherein the variably operated valve apparatus is an apparatus for controlling a valve timing in which, when the closure timing of the intake valve is varied, an open timing of the intake valve is similarly varied.

(9) The variably operated valve apparatus for use in the internal combustion engine as set forth in claim 1, wherein the first position of the closure timing of the intake valve is placed in the proximity of a piston bottom dead center.

(10) The variably operated valve apparatus for use in the internal combustion engine as set forth in claim 5, wherein the housing and the vane rotor are controlled by means of a hydraulic pressure.

(11) The variably operated valve apparatus for use in the internal combustion engine as set forth in claim 1, wherein the variably operated valve apparatus includes a mechanism which is capable of variably controlling an open timing of an exhaust valve and, at the time of the engine stop, an open timing of the exhaust valve is held at a third position of a retardation angle side.

(12) The start control apparatus of the internal combustion engine as set forth in claim 13, wherein the most retardation angle position of the closure timing of the intake valve provides a second position which is more advance angle side than the stop position of the piston of the cylinder in the compression stroke.

(13) The start control apparatus of the internal combustion engine as claimed in claim 13, wherein the variable mechanism controls a first position of the closure timing of the intake valve to a position which is more advance angle side than a most advance angle position in a control range of the stop position of the piston of the cylinder in the compression stroke.

(14) The start control apparatus of the internal combustion engine as set forth in claim 13, wherein a first position of the closure timing of the intake valve is placed in the proximity to a bottom dead center of the piston.

(15) The start control apparatus of the internal combustion engine as set forth in claim 13, wherein the variable mechanism controls a first position of the closure timing of the intake valve to a position which is more advance angle side than a most advance angle position in a control range of the stop position of the piston of the cylinder in the compression stroke.

(16) The start control apparatus of the internal combustion engine as set forth in claim 13, wherein the variable mechanism can variably control an open interval of the exhaust valve and, at the time of the engine stop, the open timing of the exhaust valve is controlled to be held at a third position at a retardation angle side, at the time of the engine start.

(17) The start control apparatus of the internal combustion engine as set forth in claim 18, wherein the most advance angle position of the open timing of the exhaust valve by means of the variable mechanism provides a fourth position at the more retardation angle side than the stop position of the piston of one of engine cylinders in an expansion stroke at the time of the engine stop by a predetermined quantity.

(18) The start control apparatus of the internal combustion engine as set forth in claim 13, wherein the stop position of the piston of the cylinder in the compression stroke is largely retarded than 90° after a piston bottom dead center.

There is provided with a variably operated valve apparatus for use in an internal combustion engine, the variably operated valve apparatus is capable of variably controlling a closure timing of an intake valve and comprising: a crank position control mechanism by means of which a stop position of a piston is controllable at a time of an engine stop; and the intake valve whose at least closure timing is placed at a first position which is more advance angle side than the stop position of the piston of one of engine cylinders in a compression stroke and which is stop controlled by means of the crank position control mechanism and one of the remaining cylinders which is in a suction stroke has its intake valve open.

This application is based on a prior Japanese Patent Application No. 2011-124771 filed in Japan on Jun. 3, 2011. The entire contents of this Japanese Patent
Application No. 2011-124771 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. A variably operated valve apparatus for use in an internal combustion engine, the internal combustion engine being equipped with a crank position control mechanism by means of which a stop position of a piston is controllable at a time of a transfer into an engine stop and the variably operated valve apparatus being capable of variably controlling at least a closure timing of an intake valve, wherein the closure timing of the intake valve is placed at a first position which is more advance angle side than the stop position of the piston of one of engine cylinders in a compression stroke and which is stop controlled by means of the crank position control mechanism, and one of the remaining cylinders which is in a suction stroke has another intake valve open, at the time of the transfer into the engine stop, and the another intake valve is open at the time of an engine start.

2. The variably operated valve apparatus for use in the internal combustion engine as claimed in claim 1, wherein, at a time of no control, at least the closure timing of the intake valve is mechanically stable at a most advance angle position and the mechanically stable position is the first position.

3. The variably operated valve apparatus for use in the internal combustion engine as claimed in claim 2, wherein a spring member is disposed in order for at least the closure timing of the intake valve to be mechanically stable at the most advance angle position, at the time of no control.

4. The variably operated valve apparatus for use in the internal combustion engine as claimed in claim 3, wherein the variably operated valve apparatus is an apparatus for controlling a valve timing in which, when the closure timing of the intake valve is varied, an open timing of the intake valve is similarly varied.

5. The variably operated valve apparatus for use in the internal combustion engine as claimed in claim 4, wherein the valve timing is controlled by relatively revolving a vane rotor fixed onto an intake side camshaft to a housing to which a revolution is transmitted from a crankshaft.

6. The variably operated valve apparatus for use in the internal combustion engine as claimed in claim 5, wherein the housing and the vane rotor are controlled by means of a hydraulic pressure.

7. The variably operated valve apparatus for use in the internal combustion engine as claimed in claim 1, wherein a most retardation angle position of the closure timing of the intake valve provides a second position at a more advance angle side than the stop position of the piston of the cylinder in the compression stroke.

8. The variably operated valve apparatus for use in the internal combustion engine as claimed in claim 1, wherein the first position of the closure timing of the intake valve is placed at a position more advance angle side than a most advance angle position within a control range of the stop position of the piston of the cylinder in the compression stroke.

9. The variably operated valve apparatus for use in the internal combustion engine as claimed in claim 1, wherein the first position of the closure timing of the intake valve is placed in the proximity of a piston bottom dead center.

10. The variably operated valve apparatus for use in the internal combustion engine as claimed in claim 1, wherein the first position of the closure timing of the intake valve is placed at a position more advance angle side than a piston bottom dead center.

11. The variably operated valve apparatus for use in the internal combustion engine as claimed in claim 1, wherein the variably operated valve apparatus includes a mechanism which is capable of variably controlling an open timing of an exhaust valve and, at the time of the engine stop, an open timing of the exhaust valve is held at a third position of a retardation angle side.

12. The variably operated valve apparatus for use in the internal combustion engine as claimed in claim 11, wherein the mechanically most advance angle position of the open timing of the exhaust valve is a fourth position at a more retardation angle side by a predetermined quantity than the stop position of the piston at one of the cylinders in the expansion stroke at the time of the engine stop.

13. A start control apparatus of an internal combustion engine, comprising:
a crank position control mechanism that is controllable to stop a stop position of a piston via a crankshaft at a time of a transfer into an engine stop; and
a variable mechanism that is controllable at least at a closure timing of an intake valve, wherein, at the time of the transfer into the engine stop, the variable mechanism controls the closure timing of the intake valve and the crank position control mechanism controls the stop position of one of engine cylinders in a compression stroke and in which a stop control is preformed by the crank position control mechanism to a position at a more retardation angle side than a predetermined position of the closure timing of the intake valve, and wherein, at the time of an engine start, the intake valve of any one of the engine cylinders in a suction stroke is open.

14. The start control apparatus of the internal combustion engine as claimed in claim 13, wherein the most retardation angle position of the closure timing of the intake valve provides a second position which is more advance angle side than the stop position of the piston of the cylinder in the compression stroke.

15. The start control apparatus of the internal combustion engine as claimed in claim 13, wherein the variable mechanism controls a first position of the closure timing of the intake valve to a position which is more advance angle side than a most advance angle position in a control range of the stop position of the piston of the cylinder in the compression stroke.

16. The start control apparatus of the internal combustion engine as claimed in claim 13, wherein a first position of the closure timing of the intake valve is placed in the proximity to a bottom dead center of the piston.

17. The start control apparatus of the internal combustion engine as claimed in claim 13, wherein a first position of the closure timing of the intake valve is controlled at a position more advance angle side than a bottom dead center of the piston.

18. The start control apparatus of the internal combustion engine as claimed in claim 13, wherein the variable mechanism can variably control an open interval of the exhaust valve and, at the time of the engine stop, the open timing of the exhaust valve is controlled to be held at a third position at a retardation angle side, at the time of the engine start.

19. The start control apparatus of the internal combustion engine as claimed in claim 18, wherein the most advance angle position of the open timing of the exhaust valve by means of the variable mechanism provides a fourth position at the more retardation angle side than the stop position of the piston of one of engine cylinders in an expansion stroke at the time of the engine stop by a predetermined quantity.

20. The start control apparatus of the internal combustion engine as claimed in claim 13, wherein the stop position of the piston of the cylinder in the compression stroke is largely retarded than 90° after a piston bottom dead center.

21. A variably operated valve apparatus for use in an internal combustion engine, the internal combustion engine being equipped with a crank position control mechanism by means of which a stop position of a piston is controllable at a time of a transfer into an engine stop and the variably operated valve apparatus being capable of variably controlling at least a closure timing of an intake valve, wherein the closure timing of the intake valve is placed at a first position which is more advance angle side than the stop position of the piston of one of engine cylinders in a compression stroke and which is stop controlled by means of the crank position control mechanism, and one of the remaining cylinders which is in a suction stroke has another intake valve open, at the time of the transfer into the engine stop, and the another intake valve remains open at the time of an engine start.

* * * * *